United States Patent
Takagi et al.

(10) Patent No.: US 7,495,634 B2
(45) Date of Patent: Feb. 24, 2009

(54) DISPLAY APPARATUS DISPLAYING THREE-DIMENSIONAL IMAGE AND DISPLAY METHOD FOR DISPLAYING THREE-DIMENSIONAL IMAGE

(75) Inventors: Ayako Takagi, Yokosuka (JP); Tatsuo Saishu, Tokyo (JP); Kazuki Taira, Tokyo (JP); Yuzo Hirayama, Yokohama (JP)

(73) Assignee: Kabushik Kaisha Toshiba, Tokyo (JP)

( * ) Notice: Subject to any disclaimer, the term of this patent is extended or adjusted under 35 U.S.C. 154(b) by 829 days.

(21) Appl. No.: 11/135,407

(22) Filed: May 24, 2005

(65) Prior Publication Data

US 2005/0264881 A1 Dec. 1, 2005

(30) Foreign Application Priority Data

May 24, 2004 (JP) .............................. 2004-153742

(51) Int. Cl.
*G09G 5/00* (2006.01)
(52) U.S. Cl. .............................................. 345/6; 345/7
(58) Field of Classification Search .................. 345/4–9; 348/51, 744; 349/3–15; 359/463, 630
See application file for complete search history.

(56) References Cited

U.S. PATENT DOCUMENTS

| | | | | |
|---|---|---|---|---|
| 6,072,443 A * | 6/2000 | Nasserbakht et al. ........... | 345/7 |
| 6,999,071 B2 * | 2/2006 | Balogh ........................ | 345/419 |
| 7,327,389 B2 * | 2/2008 | Horimai et al. .......... | 348/222.1 |
| 7,425,951 B2 * | 9/2008 | Fukushima et al. ......... | 345/419 |
| 2002/0030675 A1 * | 3/2002 | Kawai ........................ | 345/204 |
| 2004/0150583 A1 * | 8/2004 | Fukushima et al. ............ | 345/6 |
| 2004/0190146 A1 * | 9/2004 | Dohi et al. .................. | 359/619 |
| 2005/0057807 A1 | 3/2005 | Takagi et al. | |

FOREIGN PATENT DOCUMENTS

| | | |
|---|---|---|
| JP | 07-287195 | 10/1995 |
| JP | 2874985 | 1/1999 |
| JP | 2001-275134 | 10/2001 |

OTHER PUBLICATIONS

Hoshino, H. et al., "Analysis of Resolution Limitation of Integral Photography," Journal of the Optical Society of America A, vol. 15, No. 8, pp. 2059-2065, (Aug. 1998).

* cited by examiner

*Primary Examiner*—Nitin Patel
(74) *Attorney, Agent, or Firm*—Finnegan, Henderson, Farabow, Garrett & Dunner, L.L.P.

(57) ABSTRACT

A three-dimensional display apparatus is provided with an optical element including optical apertures arranged opposite a display module and in association with the parallax images. The optical apertures cause the parallax images to be displayed in a near-side region closer to an observer, while causing a three-dimensional image to be displayed in a far-side region located opposite the observer with respect to the display module. When a smooth three-dimensional image is to be displayed in the near-side region, the optical gap between the optical element and the display surface is set longer than a reference distance depending on the position of the three-dimensional image. In order to display a smooth three-dimensional image in the far-side region, the observer sets the optical gap shorter than the reference distance depending on the position of the three-dimensional image.

9 Claims, 19 Drawing Sheets

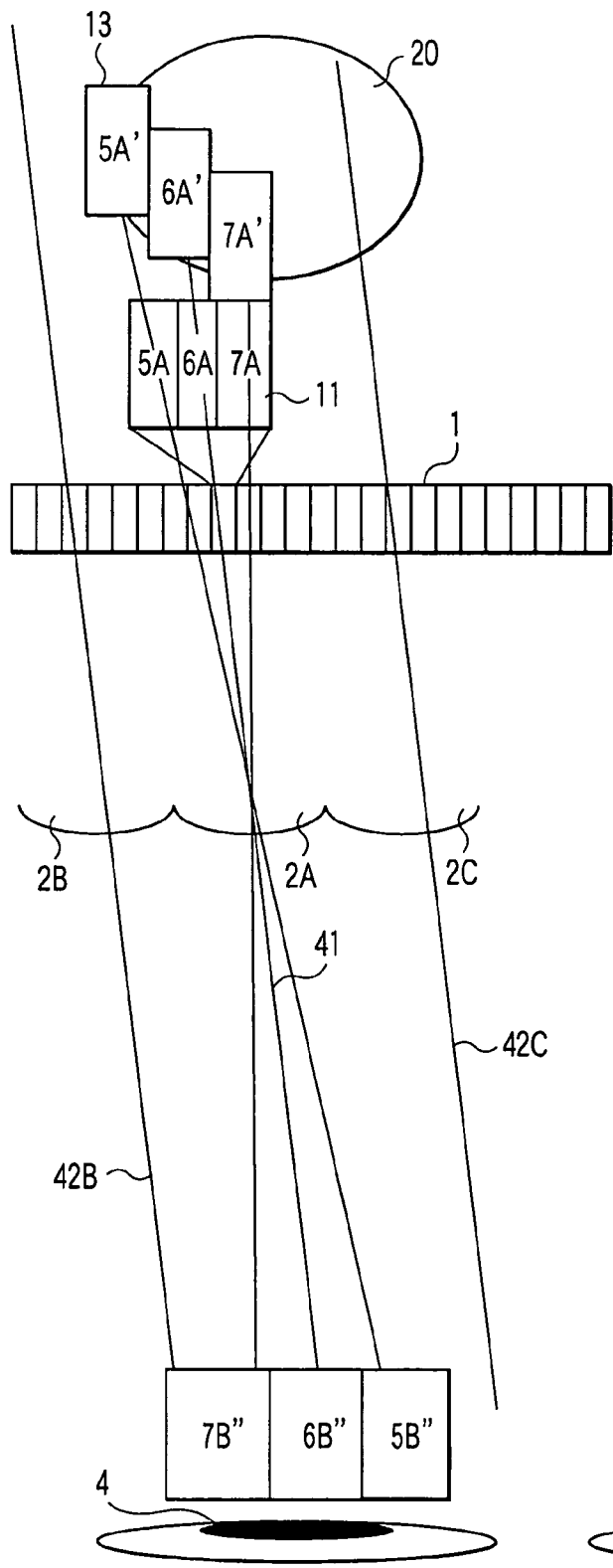
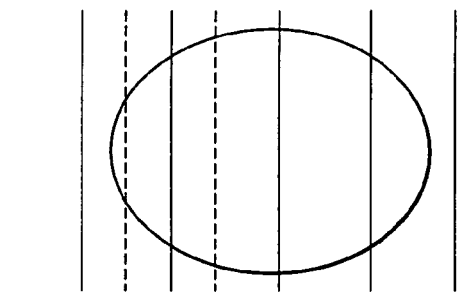
FIG. 7B
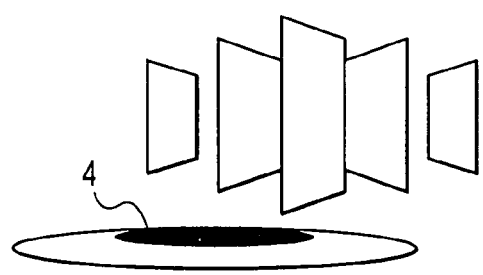
FIG. 7A  FIG. 7C

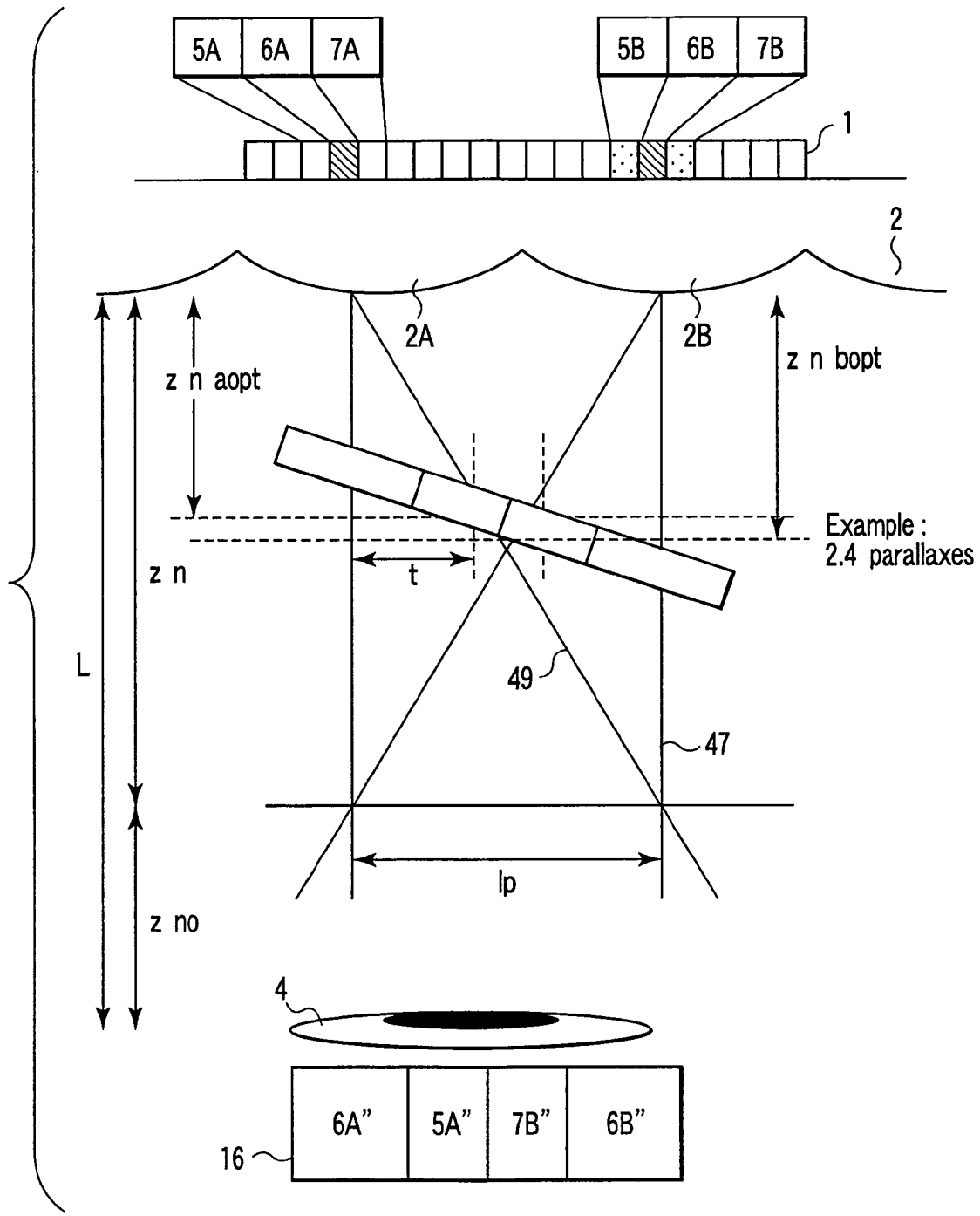
F I G. 13

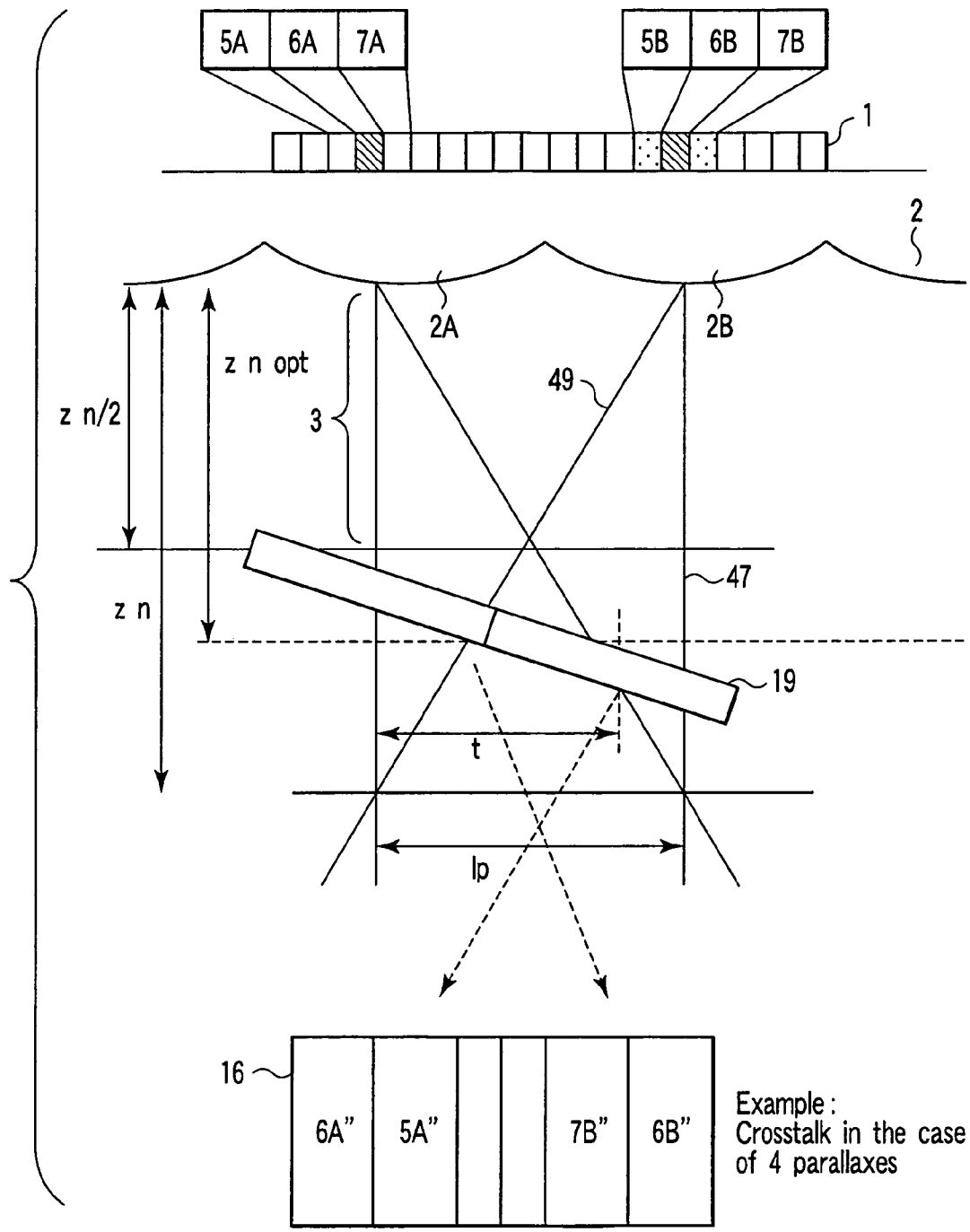
F I G. 14

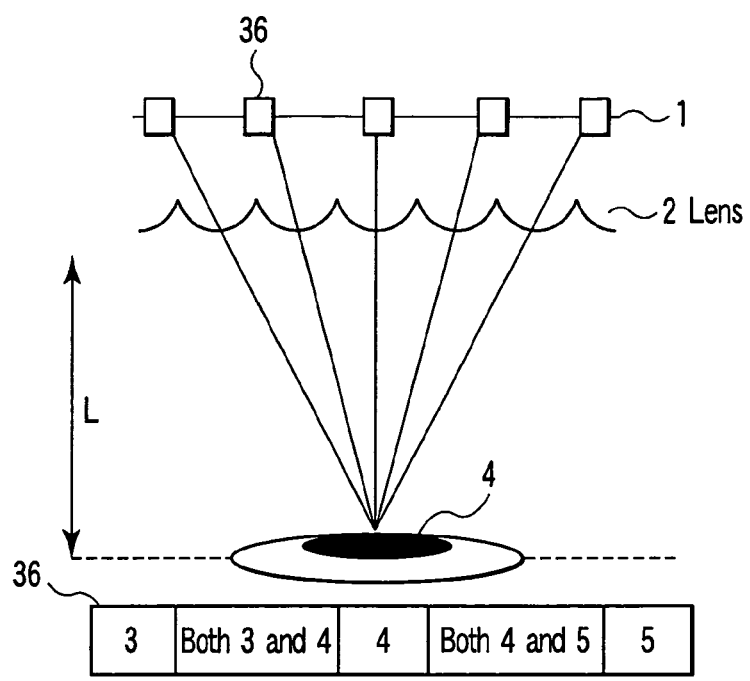
FIG. 15A
FIG. 15B
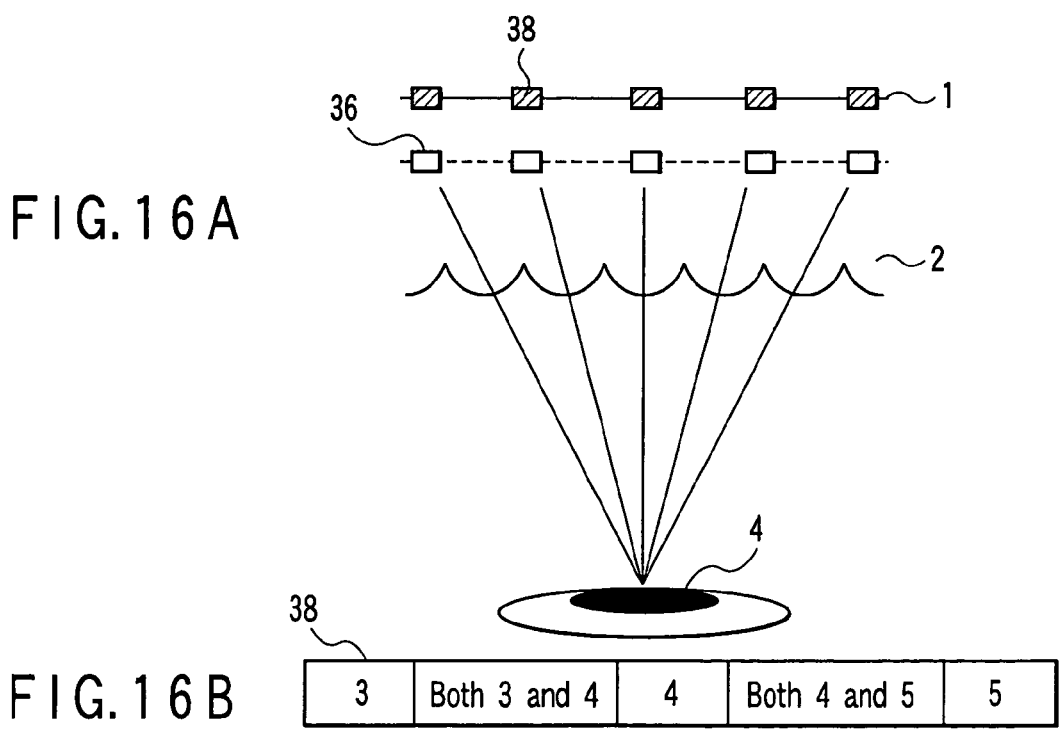
FIG. 16A
FIG. 16B

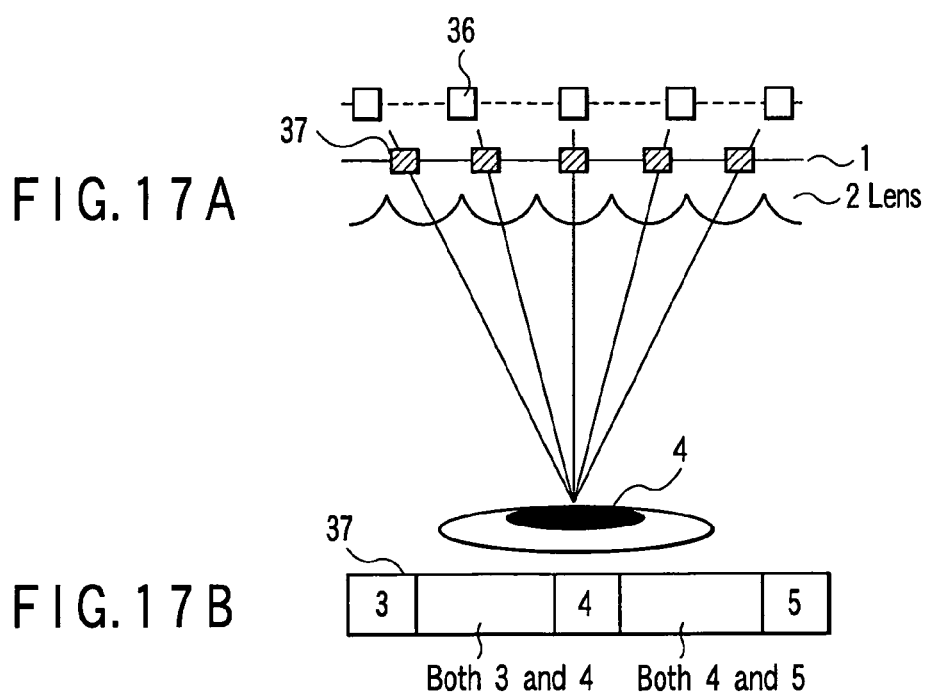
FIG. 17A
FIG. 17B
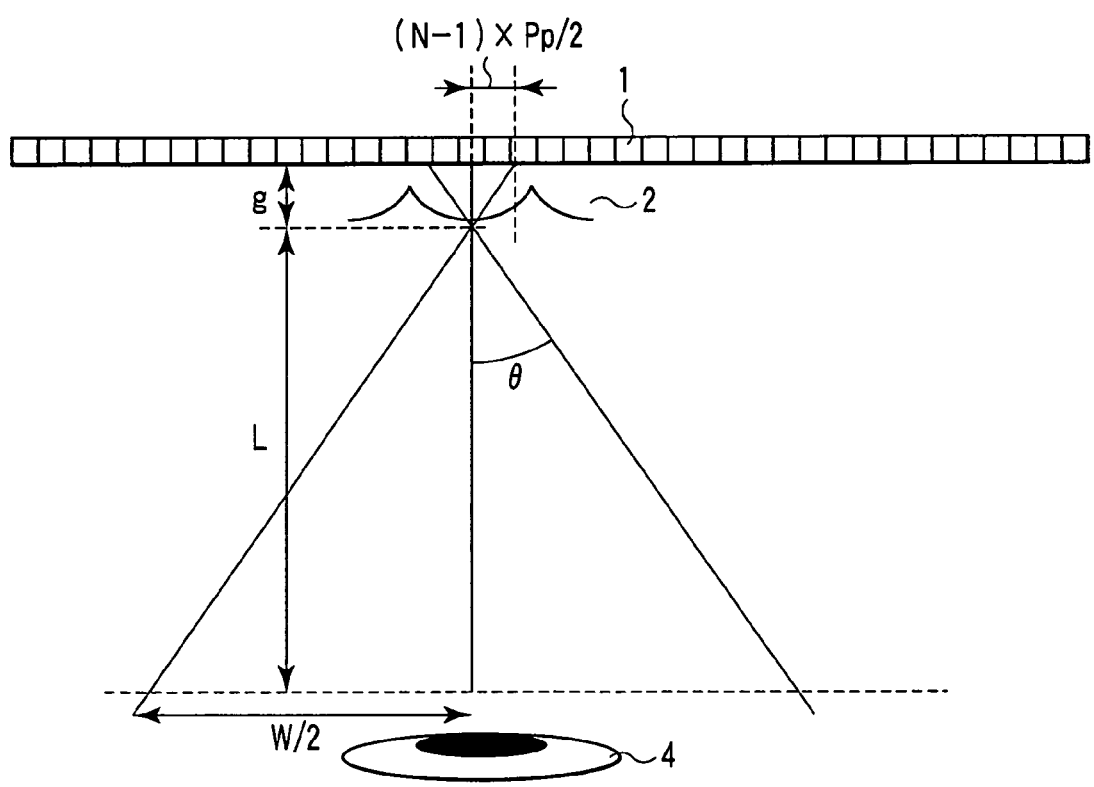
FIG. 18

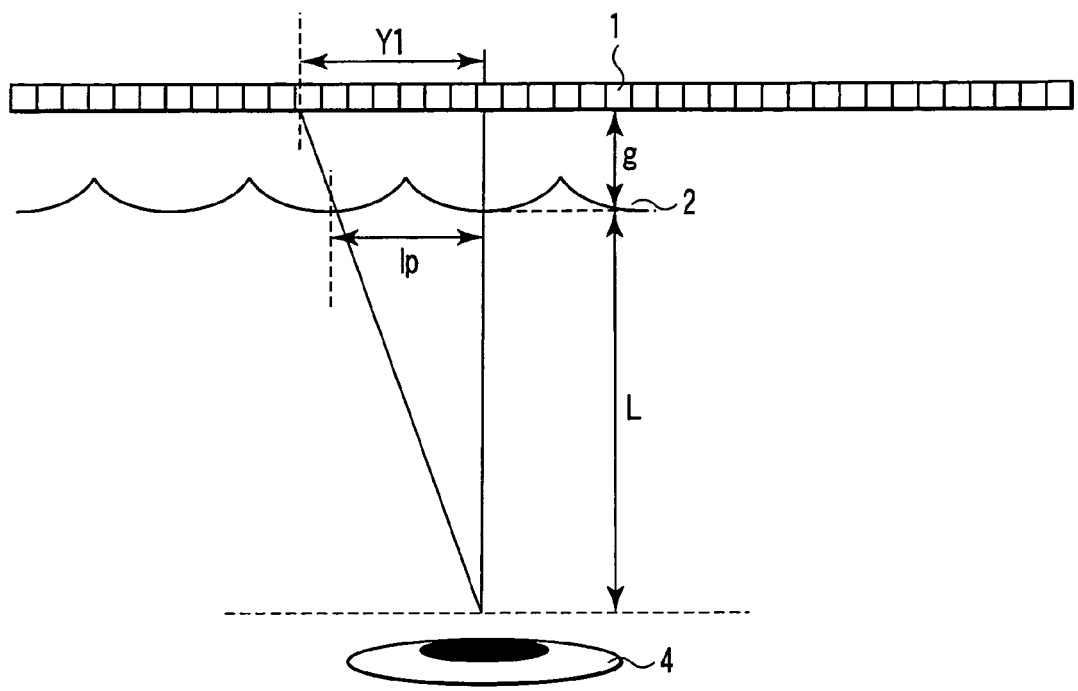
F I G. 19
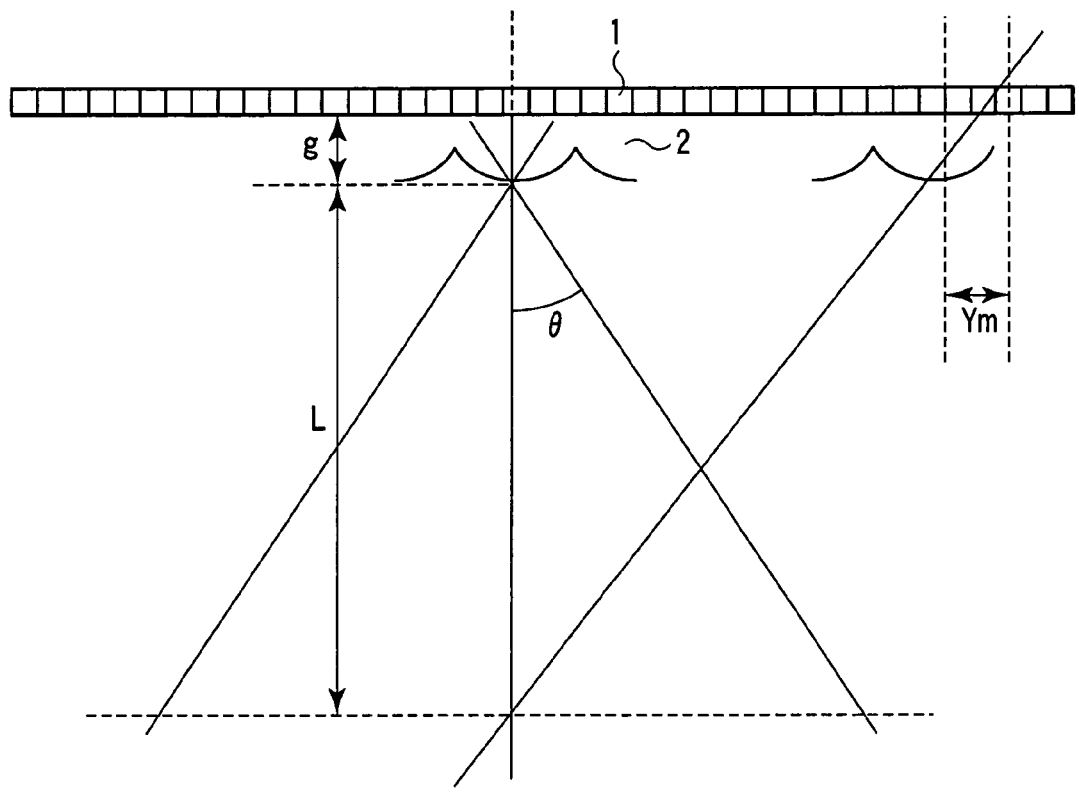
F I G. 20

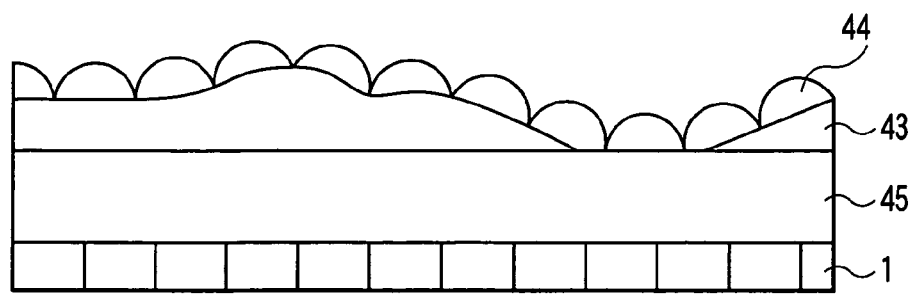
F I G. 2 4
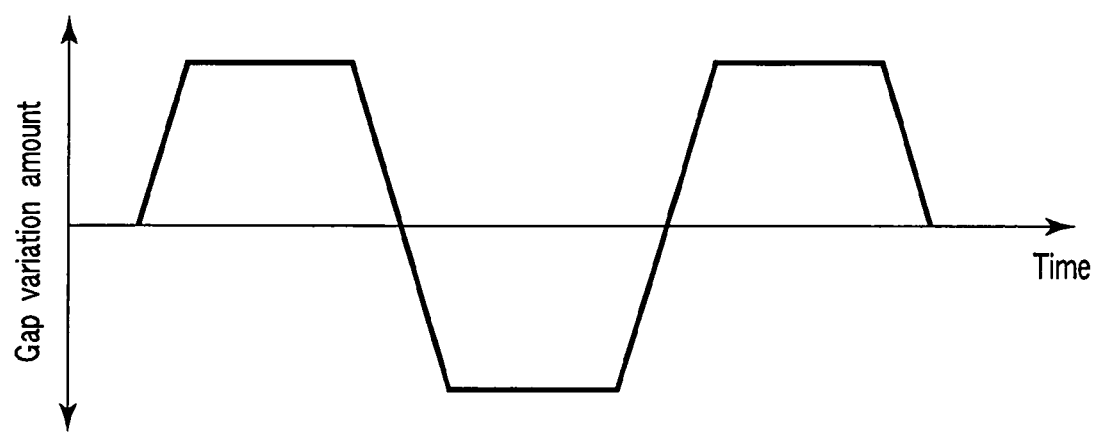
F I G. 2 5

DISPLAY APPARATUS DISPLAYING THREE-DIMENSIONAL IMAGE AND DISPLAY METHOD FOR DISPLAYING THREE-DIMENSIONAL IMAGE

CROSS-REFERENCE TO RELATED APPLICATIONS

This application is based upon and claims the benefit of priority from prior Japanese Patent Application No. 2004-153742, filed May 24, 2004, the entire contents of which are incorporated herein by reference.

BACKGROUND OF THE INVENTION

1. Field of the Invention

The present invention relates to a display apparatus displaying a three-dimensional image and a display method of displaying a three-dimensional image, and in particular, to a display apparatus displaying a three-dimensional image which apparatus comprises an optical plate, i.e., a ray control element controlling a direction in which light rays are applied, as well as a display method of displaying a three-dimensional image.

2. Description of the Related Art

An integral imaging method (also simply referred to as an II system below) for displaying a large number of parallax images is known as a system for recording a three-dimensional image and reproducing it as a three-dimensional image. The II system is also referred to as an integral photography method (IP method) and is a method of displaying three-dimensional image which method belongs to a method of ray reproduction.

In general, when an observer views an object with both eyes and if θ1 denotes the angle between a near point at a short distance and both eyes and θ2 denotes the angle between a far point at a long distance and both eyes, the angles θ1 and θ2 vary depending on the positional relationship between the object and the observer. The difference in angle (θ1-θ2) is called a binocular parallax. Human beings can react sensitively to a binocular parallax to three-dimensionally view the object.

In recent years, efforts have been made to develop a display apparatus (three-dimensional display) that displays a three-dimensional image without the need for glasses. Many such three-dimensional apparatuses use a two-dimensional display module (what is called a planar display) that displays a normal two-dimensional (2D) image. A ray control element is placed in front of or behind the display module to control certain light rays. Such a three-dimensional image display apparatus displays a three-dimensional image by utilizing the above binocular parallax to control the angle of light rays so that when the observer views the display apparatus, the light rays appear to be emitted by an object at a distance of about several centimeters from the display module. Three-dimensional images can now be displayed as described above because the display module has an increased definition, so that an image of a somewhat high definition can be obtained even if light rays from the display module is divided into pieces corresponding to several angles (called parallaxes).

FIG. 1 schematically shows the configuration of a three-dimensional display apparatus for the II system which provides parallaxes in a horizontal direction, as an example of a three-dimensional image display apparatus of no glass type.

FIG. 1 schematically shows the arrangement, in a horizontal plane, of a display module surface 61 on which a two-dimensional image is displayed and an observer 64 and a ray control element 68 that controls light rays 67 from a display module surface 61. In the display apparatus shown in FIG. 1, many pieces of image information are displayed on the two-dimensional display module 61, which displays a two-dimensional image. The observer 64 observes an image via an array plate provided in front of the display surface and corresponding to a ray control element having optical apertures and blocking sections 63. A three-dimensional image is thus displayed depending on an observing direction. The optical apertures 62 correspond to slits, pinholes, micro-lenses, lenticular lenses, or the like. In the specification, the optical apertures may be simply referred to as apertures because they can act optically as apertures even without actual apertures.

With this display apparatus, as shown in FIG. 1, the observer 64 at a position a located at a distance L from the array plate 63 can view an image with a parallax number 3. The observer 64 at a position β can view an image with a parallax number 2. Similarly, the observer 64 at a position γ can view an image with a parallax number 1. The II system enables multi-parallax display so that in spite of his or her motion, the observer 64 can view an image corresponding to his or her position. Since motion parallaxes can thus be displayed, the II system enables natural three-dimensional viewing. Further, with the II system, light rays reproducing a three-dimensional image follow paths similar to those used if an object (subject) is actually provided. Consequently, this method is also excellent in that binocular rivalry does not occur.

Methods for creating and displaying a parallax image via the apertures as pixel information are roughly classified into two types, a method of mapping images by causing pixels to generate light rays that reproduce a three-dimensional image and a method of mapping images by reversely following light rays from the viewpoint position of the observer toward the pixels. In the specification, these two methods are distinguished from each other by referring to the image mapping using the former method as the II system and referring the latter as a multi-eye display method also referred to as a multi-parallax stereoscope or parallax barrier method or the like.

With the II system, unlike the parallax barrier method or the like, a pencil of light rays are not controlled so as to be directed to the position of the observer's eye but so that a number of light rays corresponding to the number of parallaxes are emitted to the observer via all the apertures at almost equal intervals. Accordingly, the II system is excellent in motion parallaxes obtained if the observer moves. However, if the viewpoint position is fixed, the II system provides a smaller number of constituent pixels contributing to generation of a three-dimensional image at a certain angle than intrinsically two-dimensional (2D) display modules. The II system thus provides a lower resolution than three-dimensional image display apparatuses (multi-eye display apparatuses) that emit light rays to the position of the observer's eye.

In general, a certain specified resolution is required for character display or for example, spherical display having components oblique to lenses or slits. However, it is difficult for an orthographic-projection three-dimensional display apparatus (II system) comprising lenticular lenses or slits to provide fine character expressions or smooth curve displays owing to a limit to the resolution, determined by the pitch of the lenticular lenses or slits. If a three-dimensional image having a depth is to be displayed, then disadvantageously, anti-aliasing may make the boundary between a background and an image notched, or in a near-side region (a space in front of the apparatus and close to the observer), the observer may see a double image near an near-side limit of 3D image position. This is because crosstalk causes the observer to see not only a parallax image to be originally viewed but also an adjacent parallax image, thus preventing the observer from seeing only the correct parallax image.

H. Hoshino, F. Okano, H. Isono and I. Yuyama, "Analysis of resolution limitation of integral photography", J. Opt. Soc. Am, A15 (1998) 2059-2065 discloses a three-dimensional display apparatus that sets the gap between the surface of each lens and a two-dimensional pattern display module equal to the focal distance of the lens. With this three-dimensional display apparatus, parallax rays toward the observer are formed into an image, via the lenses, on the display module displaying a two-dimensional pattern. Under these conditions, the parallax rays are formed into one pixel to reduce crosstalk.

Jpn. Pat. Appln. KOKAI Publication No. 07-287195 discloses a glasses-less three-dimensional display apparatus using lenticular lenses intended to improve image quality. This image display apparatus is configured to sufficiently separate adjacent images from each other. Specifically, with this three-dimensional display apparatus, compressed images formed on an image sheet are observed via a lenticular screen consisting of a plurality of the lenticular lenses. With this three-dimensional display apparatus, each compressed image is formed on the image sheet in association with one lenticular lens. A band-like buffer area is provided between the adjacent compressed images. With this apparatus, when the adjacent compressed images are observed from a continuously varying viewpoint position via the lenticular screen, two images corresponding to these compressed images appear to be separated from each other by the buffer area. Consequently, the display apparatus reduces crosstalk. This configuration is adopted because with three-dimensional display apparatuses, visible light rays for adjacent parallax images may hinder three-dimensional viewing.

Japanese Patent No. 2874985 discloses a three-dimensional video apparatus in which a lenticular lens plate is placed opposite an image display surface to allow a three-dimensional video to be viewed from multiple directions. In this three-dimensional video apparatus, the image display surface is placed within the focal distance of the lenticular lens plate to diffuse light rays transmitted through the lenticular lens plate. The pixels on the image display surface are aligned with the lenticular lenses so that even a dark part between the pixels does not result in a dark part in a viewing area. With this display apparatus, to eliminate moiré, which causes the dark parts to appear to be striped, gap length is set equal to or smaller than the focal distance of the lenses.

Jpn. Pat. Appln. KOKAI Publication No. 2001-275134 discloses a three-dimensional display apparatus for an integral photography system which supplies the observer's eye with a three-dimensional image at the optimum position. The three-dimensional image display apparatus includes a passive array having apertures and a second array that displays an image to be displayed. The display array includes a set of sub-arrays associated with the corresponding apertures in the passive array. Each point in each sub-array is associated with the corresponding aperture in the passive array and includes information on a position on a three-dimensional image to be displayed. Light rays traveling from the points in the sub-arrays to the associated points in the passive array converge at the corresponding points on the three-dimensional image.

This display apparatus comprises control means for controlling the directions of light rays and thus the position of the three-dimensional image with respect to the passive and second arrays. The control means is suitably provided so as to control the distance between the passive array and the second array. Japanese Patent No. 2874985 enables the gap and thus the display position to be varied to provide a three-dimensional display that is optimum for the observer. This patent does not refer to light rays for adjacent parallax images.

A problem with the II system is that when a three-dimensional image is reproduced at a position away from the display surface, a pencil of light rays assigned via the apertures or lenses spread to rapidly reduce the resolution. The disadvantageous decrease in resolution will be described below with reference to FIGS. 2, 3, and 4.

A cycle per radian (cpr) $\beta$ is used as a measure for expressing the resolution of a three-dimensional display apparatus. The cycle per radian $\beta$ is an index indicating the number of cycles in which the brightness of light rays per radian can be displayed. As shown in Jpn. Pat. Appln. KOKAI Publication No. 07-287195, if with the II system, a three-dimensional image 73 is displayed near the display apparatus (the distance zi from the observer 64 to the three-dimensional image 73 is also sufficiently short) as shown in FIG. 2, the resolution is determined by a pixel pitch called a Nyquist frequency ($\beta nyq$) and viewed by the observer 64 via the lenses or the apertures 62. The pitch of the apertures 62 and the distance between the observer 64 and the apertures 62 or lenses are defined as pe and L, respectively. Then, the resolution ($\beta nyq$) limited by the aperture pitch pe is expressed by:

$$\beta nyq = L/2pe \quad (1\text{-}1)$$

Then, if the object image 73 is reproduced at a position away from the display surface of the display module 1 (the distance zi from the observer 64 to the three-dimensional image 73 is also sufficiently long) as shown in FIG. 3, a pencil of light rays assigned via the apertures or lenses spread to rapidly reduce the resolution. If the object image 73 is to be reproduced in the front- or far-side region, when the maximum value of the resolution calculated for the group of light rays 67 emitted through one of the slits 68 in order to reproduce the three-dimensional image 73 is defined as $\alpha imax$, a resolution $\beta imax$ determined by the spatial frequency of the object as viewed by the observer is expressed by:

$$\beta imax = \alpha imax \, Zi/|L-Zi| \quad (1\text{-}2)$$

An actual resolution Bimax is the lower of (1-1) and (1-2) and is thus expressed by:

$$\beta imax = \min(\beta imax, \beta nyq) \quad (3)$$

In FIGS. 2 and 3, a coordinate Z corresponds to a distance extending from the observer 64 along a normal to the display surface 1 of the display module 1. The distance from the apertures or lenses to the object image 73 is denoted by (L-Zi). The distance between the display surface 61 and the observer 64 is denoted by Z(=L+g). The maximum value of the resolution $\alpha imax$ depends on the angle $\alpha cpr$ formed by straight lines joining one of the slits 68 and the horizontal ends of the object image together. The near-side region means a front area with respect to the observer 64 which corresponds to an observer side of the display apparatus. The far-side region means a rear area with respect to the observer 64 which corresponds to a side of the display apparatus which is opposite the observer. The three-dimensional image display apparatus for the II system can form a three-dimensional image in the near- or far-side region.

Expression (1-1) indicates that the resolution of the three-dimensional image increases with decreasing aperture pitch, that is, increasing definition of the display surface. However, a reduction in the pixel pitch of the display surface of the display module may for example, require processes executed by the display module to be changed. Accordingly, this cannot be easily realized.

Further, as is apparent from Jpn. Pat. Appln. KOKAI Publication No. 07-287195, if the three-dimensional image is formed near the display surface, the resolution βnyq, limited by the aperture pitch, is lower than the resolution βimax, determined by the spatial frequency of the object. Consequently, the resolution βnyq, limited by the aperture pitch, is predominant. On the other hand, the farther the three-dimensional image is from the display surface, the shorter the distance Zi from the observer in Expression (1-2) is. Consequently, the resolution βimax becomes predominant. For example, the resolutions determined from Expressions (1) and (1-2) for a certain number of parallaxes and a certain viewing area angle has the relationship shown in FIG. 4. In FIG. 4, an axis z indicates the distance from the observer to the three-dimensionally displayed object, and z=L(m) denotes the position of the display apparatus. The axis of ordinate indicates the resolution βnyq, determined by Expression (1-1) and depending on the lens pitch, and the resolution βimax, determined by Expression (1-2) and by the density of light rays emitted from one of the lenticular lenses. FIG. 4 indicates that if the object is displayed near the display surface, that is, in an area with a near-side amount zn=zno(m) and a far-side amount zf=zfo(m), βnyq (1-1), determined by the lens pitch, is lower than βimax and is thus predominant. If the object is displayed in an area with a near-side amount larger than zn or a far-side amount larger than zf, βimax (1-2), determined by the density of light rays from the apertures, is predominant.

Crosstalk is a phenomenon in which the observer views light rays from a parallax image that is intrinsically not to be seen. Specifically, the defocusing of the lenses, a diffusion plate, or the like may prevent a pencil of light rays seen by the observer from being focused on the two-dimensional pattern display surface. The observer thus views light rays containing adjacent parallax images. The crosstalk may make curves and oblique lines notched, resulting in a degraded image in which the object to be displayed is mixed with its background. If for example, a round ball is to be displayed in a far-side direction, the contour of the round ball may disadvantageously be notched.

The crosstalk phenomenon occurs more markedly in parallax images to be emitted by two-dimensional display devices in certain ray directions, the observer views light rays for not only the desired parallax images but also the adjacent ones. The crosstalk also results from the defocusing of the lenses, the insertion of a diffusion film, or the like. The crosstalk may reduce the resolution.

BRIEF SUMMARY OF THE INVENTION

It is an object of the present invention to provide a three-dimensional display apparatus that can improve resolution.

According to the present invention, there is provided a display apparatus comprising:

a display module having a display surface on which pixels are arranged in matrix, parallax images being allotted to the pixels;

an optical element placed opposite the display module and comprising optical apertures arranged in association with the parallax images and used to display the parallax images in a near-side region closer to an observer and a three-dimensional image in a far-side region located opposite the observer with respect to the display module; and a gap adjusting section which, when a three-dimensional image which attracts attention from the observer is displayed in the near-side region, sets an optical gap between the optical element and the display surface longer than a reference distance depending on a position of the three-dimensional image, and when the three-dimensional image which attracts attention from the observer is displayed in the far-side region, sets the optical gap shorter than the reference distance depending on the position of the three-dimensional image.

Further, according to the present invention,
in the display apparatus,
the optical element includes a lenticular lens, the optical apertures correspond to respective lenses of the lenticular lens, and the reference distance corresponds to a focal distance of each lenticular lens.

Moreover, according to the present invention,
in the display apparatus,
when a gap length gn is set when the three-dimensional image is displayed in the near-side region on a first coordinate (znopt), a gap length gf is set when the three-dimensional image is displayed in the far-side region on a second coordinate (zfopt), and the gap lengths gn and gf are substantially set as shown in:

$$gn = f + zn \times (f \times \cos\theta \times p_p)/znopt/lp \quad (1)$$

$$gf = f - zf \times (f \times \cos\theta \times p_p)/zfopt/lp \quad (2)$$

where f denotes the focal distance of each lens, L denotes a viewing distance corresponding to a reference distance estimated when the three-dimensional image is observed, lp denotes a pitch of the lenses, 2θ denotes a viewing area angle which defines a range in which the correct three-dimensional image is observable, the viewing area angle being defined in a plane containing an optical axis of the lens, and $p_p$ denotes a pitch of the pixels. Further, zn and zf are defined by:

$$zn = L \times D/(1+D) \quad (3)$$

$$zf = L \times D/(1-D) \quad (4)$$

where D is defined by following equation.

$$D = \frac{(l_p)^2}{2 L p_p \tan(\theta)}$$

Furthermore, the first and second coordinates znopt and zfopt have ranges defined by:

$$0 < Znopt < L \times D/(1+D)/2 \quad (5)$$

$$0 < Zfopt < L \times D/(1-D)/2 \quad (6).$$

BRIEF DESCRIPTION OF THE SEVERAL VIEWS OF THE DRAWING

FIGS. 7A, 7B and 7C are schematic diagrams of a horizontal plane showing the loci of light rays in the display apparatus shown in FIG. 5, the loci being obtained when a three-dimensional object is displayed in the far-side region, and plane views showing the relationship between parallax images on the two-dimensional device and parallax images projected on the pupil, in connection with the three-dimensional image, displayed in the far-side region;

FIG. 13 is a schematic diagram showing the relationship between parallax images and the loci of light rays for them, the relationship being observed when the three-dimensional object moves away from the display surface in the three-dimensional display apparatus shown in FIG. 5;

FIG. 14 is a schematic diagram showing the relationship between parallax images and the loci of light rays for them, the relationship being observed when the three-dimensional object moves away from the display surface in the three-dimensional display apparatus shown in FIG. 5;

FIG. 15A is a diagram showing the loci of a plurality of principal rays incident on the eye through the lenses, the loci being obtained when the gap is equal to the focal distance of each lens in the three-dimensional display apparatus shown in FIG. 5;

FIG. 15B is a schematic diagram showing the relationship between a display position and parallax images on two-dimensional display devices which are projected the principal rays on the pupil in the three-dimensional display apparatus shown in FIG. 15A;

FIG. 16A is a diagram showing the loci of a plurality of principal rays incident on the eye through the lenses, the loci being obtained when the gap is longer than the focal distance of each lens in the three-dimensional display apparatus shown in FIG. 5;

FIG. 16B is a schematic diagram showing the relationship between the display position and the parallax images on the two-dimensional display devices which are projected by the principal rays on the pupil in the three-dimensional display apparatus shown in FIG. 16A;

FIG. 17A is a diagram showing the loci of a plurality of principal rays incident on the eye through the lenses, the loci being obtained when the gap is shorter than the focal distance of each lens in the three-dimensional display apparatus shown in FIG. 5;

FIG. 17B is a schematic diagram showing the relationship between the display position and the parallax images on the two-dimensional display devices which are projected by the principal rays on the pupil in the three-dimensional display apparatus shown in FIG. 17A;

FIG. 18 is a diagram of the loci of light rays showing the relationship among gap, viewing distance, and viewing area angle in the three-dimensional display apparatus shown in FIG. 5;

FIG. 19 is a diagram of the loci of light rays showing the relationship among gap, viewing distance, pixel pitch, and lens pitch in the three-dimensional display apparatus shown in FIG. 5;

FIG. 20 is a diagram of the loci of light rays showing the relationship among gap, viewing distance, and viewing area angle at a screen end in the three-dimensional display apparatus shown in FIG. 5;

FIG. 24 is a sectional view schematically showing a three-dimensional display apparatus according to another embodiment of the present invention;

FIG. 25 is a waveform diagram of yet another embodiment showing a method of driving the three-dimensional display apparatus shown in FIG. 5.

DETAILED DESCRIPTION OF THE INVENTION

With reference to the drawings, a detailed description will be given of a display apparatus according to embodiments of the present invention.

Figure 1:
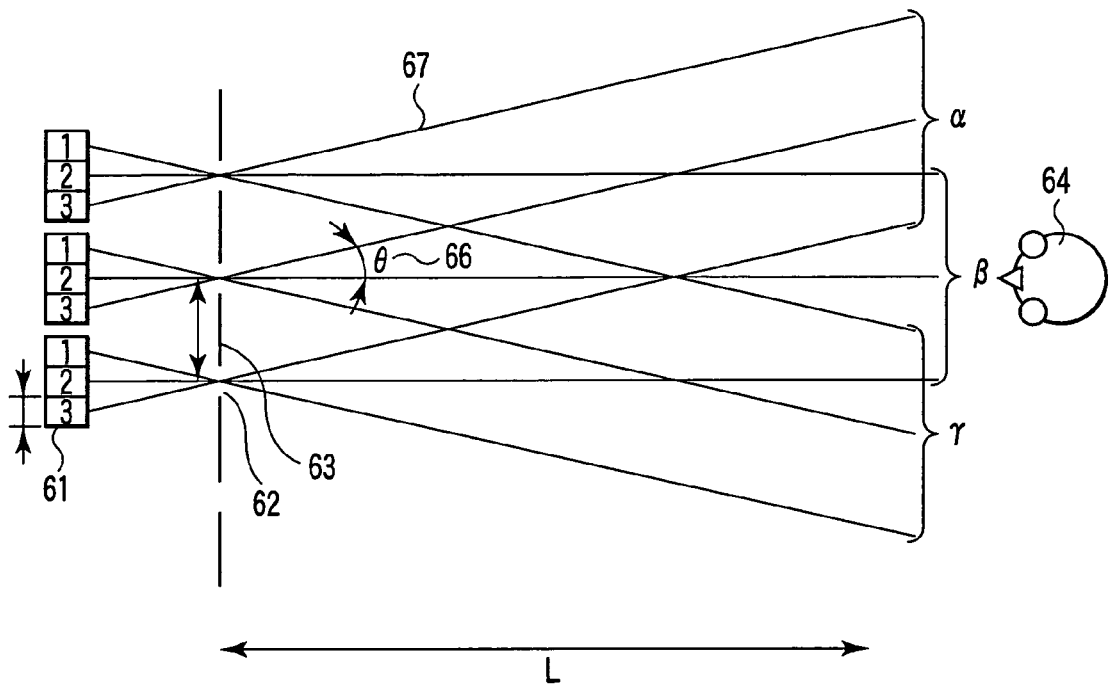
FIG. 1 is a schematic diagram of a horizontal plane schematically showing the loci of light rays according to the II method to describe the principle of three-dimensional image display based on the II method.
Figure 2:
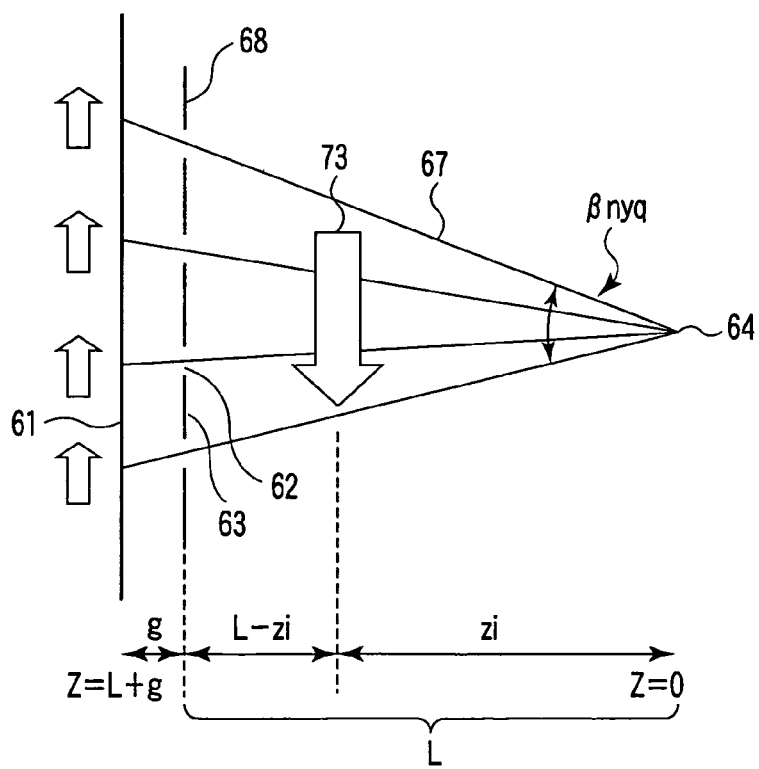
FIG. 2 is a schematic diagram of a horizontal plane illustrating a resolution based on the Nyquist frequency according to the II system.
Figure 3:
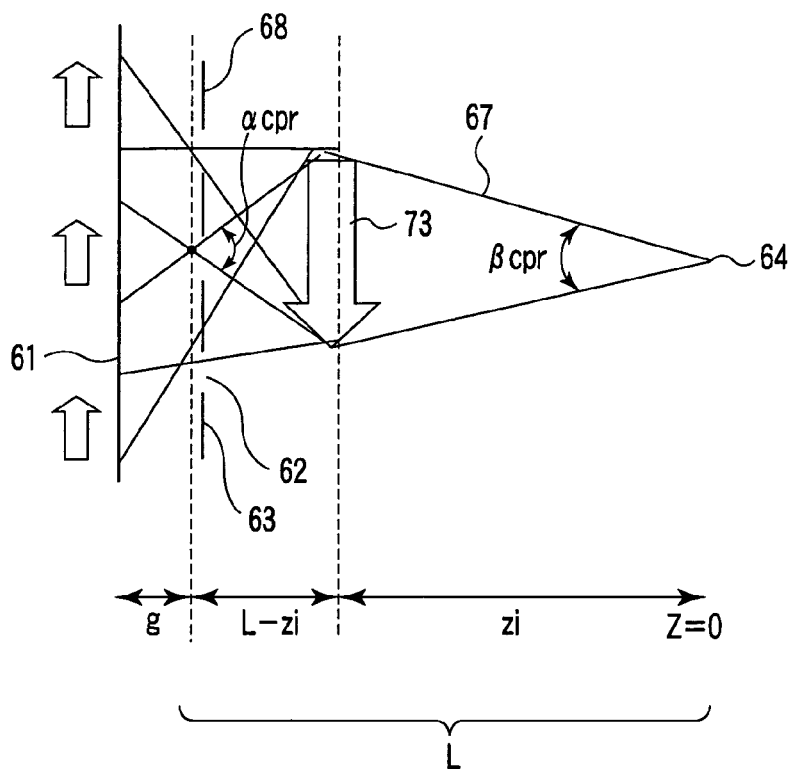
FIG. 3 is a schematic diagram of a horizontal plane showing three-dimensional image display to describe the improvement of the resolution based on the density of light rays emitted by one lens according to the II system.
Figure 4:
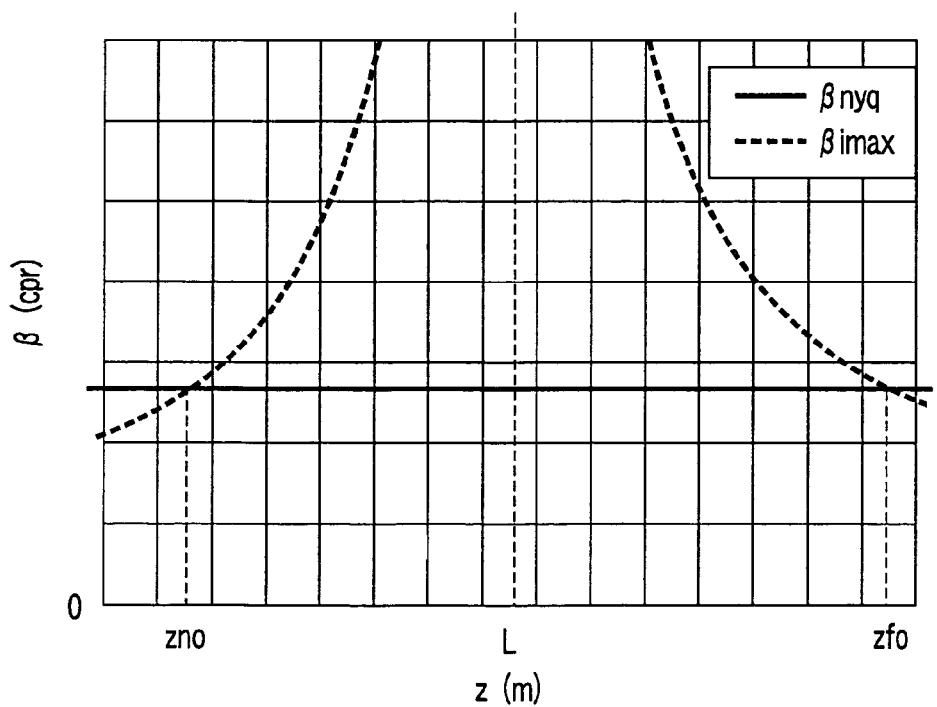
FIG. 4 is a graph showing the relationship between the resolution and the position of a front- or far-side region in which a three-dimensional image is displayed.
Figure 5:
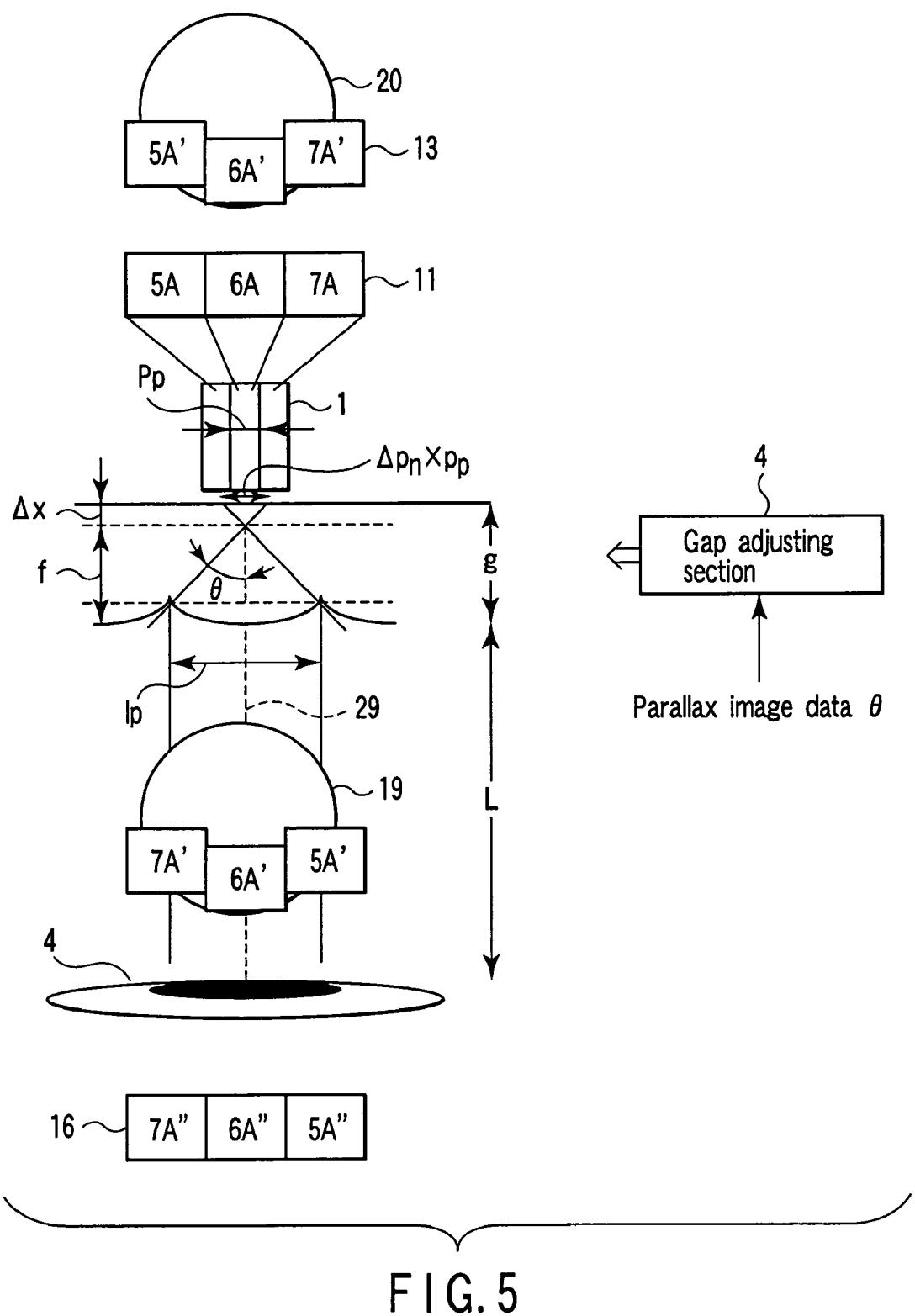
FIG. 5 is a schematic diagram of a horizontal plane schematically showing a three-dimensional display apparatus according to a first embodiment of the present invention.

FIG. 5 is a horizontal sectional view schematically showing a three-dimensional display apparatus according to a first embodiment of the present invention. As shown in FIG. 5, lenticular lenses 2 as ray control elements are arranged in front of a display surface of a two-dimensional display module 1 via a gap g. Pixels are arranged on the two-dimensional display module 1 at a pixel pitch Pp. The lenticular lenses 3 are arranged in a horizontal direction at a lens pitch lp with the major axis of each lenticular lens 2 extending in a vertical direction. Each lenticular lens 2 has a focal distance f. The display apparatus shown in FIG. 5 is also provided with a gap varying section 4; a specific example of the structure of the gap varying section 4 will be described later. The gap varying section 4 adjusts the gap in accordance with a three-dimensional image to be displayed. The optical system shown in FIG. 5 is an example in which the gap g (=gn, gf) is longer than the focal distance f of the lens by a very small value +Δx.

The pixels are arranged on the two-dimensional display module 1 in matrix. Parallax images are allotted to these pixels. Light rays from the parallax images are incident on an observer's pupil 4 via the respective lenticular lenses 2. Since the light rays from the parallax images are controlled by the lenticular lenses 2 before entering the observer's pupil, a three-dimensional image 19 is displayed between the two-dimensional display module 1 and the observer's pupil 4 in a near-side region. A three-dimensional image 20 is also displayed behind the two-dimensional display module 1 (in a far-side region). These three-dimensional views are viewed by the observer.

If the three-dimensional image 19 of a high resolution is to be displayed in the near-side region, the gap gn is adjusted as indicated by:

$$gn = f + \Delta x = f + zn \times (f \times \cos\theta \times p_p)/znopt/lp \quad (1)$$

If the three-dimensional image 20 of a high resolution is to be displayed in the far-side region, the gap gn is adjusted as indicated by:

$$gf = f - \Delta x = f - zf \times (f \times \cos\theta \times p_p)/zfopt/lp \quad (2)$$

In this case, the adjustment of the gap g (=gn, gf) includes not only the adjustment of the very short distance ±Δx but also the adjustment of the focal distance f. Further, the very short distance ±Δx and the focal distance f correspond to values in terms of a refractive index (n=1) in the air. These distances mean values in terms of the air if a void extending over the very short distance ±Δx is a medium different from air.

Here, znopt denotes a coordinate of the three-dimensional object 19 in a near-side direction from the two-dimensional display module 1, and zfopt denotes a coordinate of the three-dimensional object 20 in a far-side direction from the two-dimensional display module 1. The coordinates znopt and zfopt may be set at average values for the three-dimensional images displayed along a Z axis (axis perpendicular to the two-dimensional display module 1) or at values for typical points in the three-dimensional images. In either case, the coordinates znopt and zfopt have only to be set within the three-dimensional images. Further, θ corresponds to the half of a viewing area angle 2θ that defines the range in which the normal three-dimensional images 19 and 20 are visible (the range in which false images are displayed is excluded). Furthermore, zn and zf are defined by:

$$zn = L \times D/(1+D) \quad (3)$$

$$zf = L \times D/(1-D) \quad (4)$$

D in Expressions (3) and (4) are defined by:

$$D = \frac{(l_p)^2}{2 L p_p \tan(\theta)}$$

Further, L denotes the distance from the ray control elements 2 to the observer 4.

If the front- and far-side amounts znopt and zfopt of the three-dimensional images 19 and 20 are within the following ranges:

$$0 < Znopt < L \times D/(1+D)/2 \quad (5)$$

$$0 < Zfopt < L \times D/(1-D)/2 \quad (6)$$

then the gap g (=gn, gf) is adjusted to display the three-dimensional images 19 and 20 of a high resolution in the front- and far-side regions, respectively.

Figure 6:
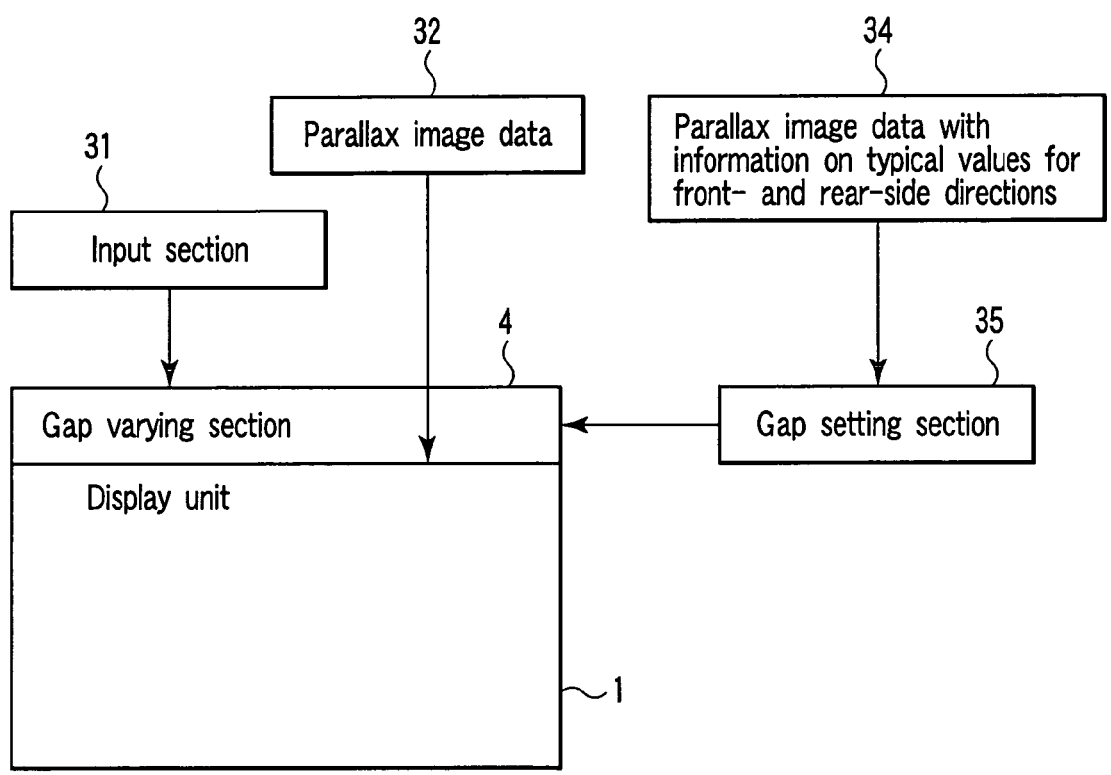
FIG. 6 is a block diagram schematically showing the system of the display apparatus according to the embodiment of the present invention.

With the above display apparatus, in order to adjust the gap g (=gn, gf) in accordance with the three-dimensional images 19 and 20 to be displayed, the user can cause the display module 1 to display parallax images, by using an input section 31 to specify one of the front- and far-side regions, select one of the provided adjustment values for the gap g (=gn, gf), and instruct the gap varying section 4 to adjust the gap in accordance with the selected adjustment value, as shown in FIG. 6. It is also possible to cause the three-dimensional images 19 and 20 to be sequentially displayed, by switching the provided adjustment values for the gap g (=gn, gf) to set a gap value at which the best three-dimensional images 19 and 20 are displayed.

Alternatively, parallax image data 34 containing the front- and far-side amounts znopt and zfopt may be provided such that a gap setting section 35 generates a gap adjustment signal in accordance with the front- and far-side amounts znopt and zfopt to allow the gap varying section 4 to set an appropriate gap in accordance with the gap adjustment signal. The front- and far-side regions may be specified by the user or preset.

Description will be given below of the reason why the three-dimensional images 19 and 20 of a high resolution can be displayed by adjusting the gap as described above.

First, with reference to FIGS. 7A, 7B, 7C, 8A, 8B, and 8C, description will be given of the relationship between the position at which the two-dimensional device maps a parallax image and adjacent parallax images viewed by the observer; the mapped parallax image is used to display the three-dimensional object 19 in the near-side region and the three-dimensional object 20 in the far-side region.

FIGS. 7A, 7B, and 7C show the relationship between parallax images on the two-dimensional device and parallax images contributing to the three-dimensional objects and parallax images projected on the pupil, in connection with the three-dimensional image 20, displayed in the far-side region. With reference to FIG. 7A, description will be given of how the observer sees, via a lens 2A, not only light rays emitted from a parallax image 6A on the two-dimensional display device but also light rays from parallax images 5A and 7A adjacent to the parallax image 6A. Not only light rays from the parallax image 6A but also a pencil of light rays from the parallax images 5A and 7A are incident on the lens 2A; the parallax image 6A corresponds to the lens 2A and the parallax images 5A and 7A are located adjacent to the parallax image 6A. Not only a part 6A' of the three-dimensional image 6A but also its peripheral parts 5A' and 7A' are displayed in the far-side region. That is, not only the part 6A' but also the peripheral parts 5A' and 7A' contribute to the display of the three-dimensional image 20 in the far-side region. The peripheral parts 5A' and 7A' are symmetric with respect to a principal ray 41 passing through the parallax image 6A and lens 2A. The peripheral parts 5A' and 7A' are arranged on the left and right, respectively, of the part 6A' in the same direction as in the case of the arrangement of the parallax images 5A and 7A on the display surface. A pencil of light rays from the display parts 5A', 6A', and 7A' form display images 5A", 6A", and 7A" in the observer's pupil 4. The display images 5A" and 7A", displayed in the observer's pupil, are symmetric with respect to the display image 6A". The display images 5A" and 7A" are arranged laterally opposite the parallax images 5A and 7A on the two-dimensional display device.

Figure 8A:
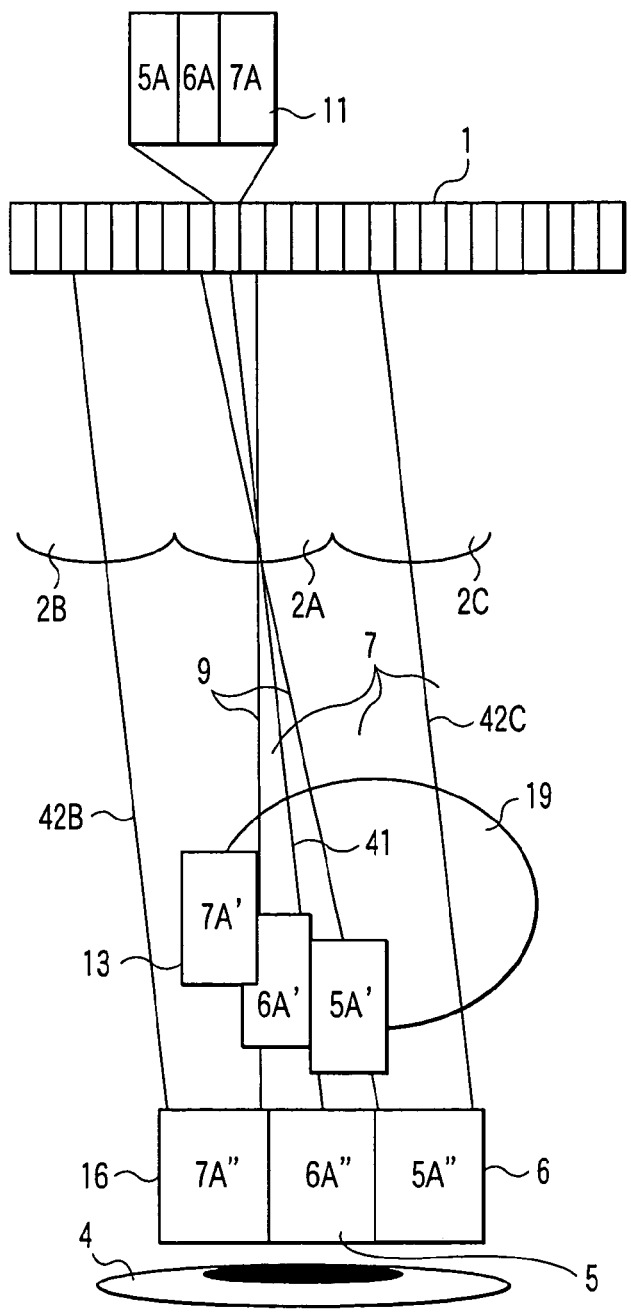
FIGS. 8A, 8B and 8C are schematic diagrams of a horizontal plane showing the loci of light rays in the display apparatus shown in FIG. 5, the loci being obtained when the three-dimensional object is displayed in the near-side region and plane views showing the relationship between parallax images on the two-dimensional device and parallax images projected on the pupil, in connection with the three-dimensional image, displayed in the near-side region.
Figure 8B:
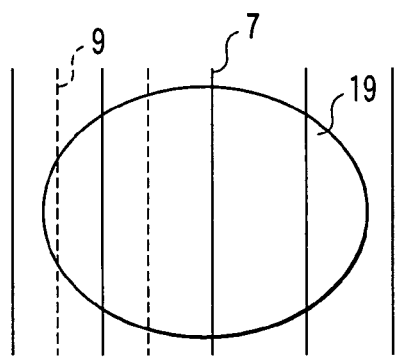
Figure 8C:
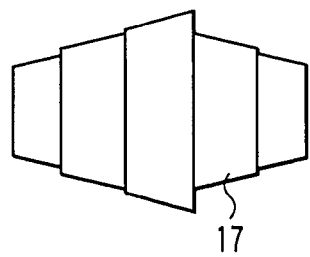

FIGS. 8A, 8B, and 8C show the relationship between parallax images on the two-dimensional device and parallax images contributing to the three-dimensional objects and parallax images projected on the pupil, in connection with the three-dimensional image displayed in the near-side region. Attention is paid to the lens 2A on the two-dimensional display device. As described above, not only light rays from the parallax image 6A but also a pencil of light rays from the parallax images 5A and 7A are incident on the lens 2A; the parallax image 6A corresponds to the lens 2A and the parallax images 5A and 7A are located adjacent to the parallax image 6A. The part 6A' of the three-dimensional image 19 and its peripheral parts 5A' and 7A' are displayed in the near-side region. That is, these image parts 5A', 6A', and 7A' contribute to the display of the three-dimensional image 19. The peripheral parts 5A' and 7A' are symmetric with respect to the principal ray 41 passing through the parallax image 6A and then the lens 2A. The parallax images 5A and 7A on the display surface are arranged laterally opposite each other. The pencil of light rays from the display portions 5A, 6A, and 7A form display images 5A", 6A", and 7A" in the observer's pupil 4. The display images 5A" and 7A", displayed in the observer's pupil, are symmetric with respect to the display image 6A". The display images 5A" and 7A" are arranged laterally opposite the parallax images 5A and 7A on the two-dimensional display device.

As described above, the parallax images 5A, 6A, and 7A on the two-dimensional display device are always laterally opposite to the parallax images 5A", 6A", and 7A", which enter the pupil 4. However, the parallax images that contributes to form the three-dimensional object 19 in the near-side region are arranged laterally at the same positions as those of the parallel images 5A", 6A", and 7A", which are emitted to the observer. In contrast, the parallax images 5A', 6A', and 7A', which contribute to form the three-dimensional object 20 in the far-side region, are arranged laterally opposite the parallel images 5A", 6A", and 7A".

If the ray density is improved to cause crosstalk in which adjacent parallax images different from light rays corresponding to the desired direction enter the eye, then as shown in FIG. 8A, principal rays from lenses 2B and 2C adjacent to a lens 2A compensate for the display of the three-dimensional image 19 in the near-side region in the desired direction. Thus, the adjacent parallax images 5A and 7A contribute to the smooth display of the three-dimensional image. When the three-dimensional image 19 having a curved or oblique contour is to be displayed as shown in FIG. 8B, it can be displayed with a relatively smooth contour as shown in FIG. 8C by allowing the adjacent parallax images to be incident on the pupil at appropriate positions.

Further, as shown in FIG. 7A, principal rays 41, 42B, and 42C from the lenses 2B and 2C, which are adjacent to the lens 2A, also contribute to the formation of the three-dimensional image 20 in the far-side region. However, the adjacent parallax images formed by the pencil of light rays including the principal light rays 41, 42B, and 42C are arranged laterally opposite the parallax images 5A", 6A", and 7A". Accordingly, as shown in FIG. 7B, when a three-dimensional object with a curved or oblique contour is displayed, if adjacent parallax images enter the pupil, the three-dimensional image is displayed with a notched contour as shown in FIG. 7C. That is, the luminous flux including the principal rays 41, 42B, and 42C, which pass through the adjacent lenses 2B and 2C, does not contribute to the improvement of the resolution as shown in FIG. 8C. In fact, the luminous flux is a factor that reduces the resolution.

Now, description will be given of conditions for the display of a three-dimensional image having a smooth contour as shown in FIG. 8A.

Description will be given of the relationship between an actual three-dimensional object and a parallax image projected on the pupil 4 if crosstalk is controlled by defocusing the lenses.

As shown in FIG. 5, it is assumed that the gap g is equivalent to or longer than the focal distance f. Upon entering the lens 2, parallel rays traveling from the pupil 4 to the lens 2 are condensed at the focal distance f. Since the light rays propagate rectilinearly, they cross each other on the two-dimensional display device. The light rays thus travel laterally opposite to each other with respect to the optical axis of the lens 2. Thus, the relationship between the principal ray 6A' for the three-dimensional image 19 and the adjacent parallax images 5A' and 7A' is laterally opposite to that between the principal rays 6A' and the adjacent parallax images 5A and 7A on the two-dimensional display device as previously described. Consequently, the arrangement of the adjacent parallax images 5A" and 7A", which are incident on the pupil 4, is the same as that of the adjacent parallax images 5A' and 7A' for the three-dimensional image 19. Therefore, even if a sphere such as the one shown in FIG. 8A is displayed, the principal rays from the adjacent lenses 2B and 2C, which correspond to crosstalk, are visible but are smoothly joined to the adjacent parallax images 5A' and 7A'.

However, as shown in FIG. 7A, the relationship between the principal ray 6A" for the three-dimensional object 20, displayed in the far-side region, and the adjacent parallax images 5A" and 7A" is laterally the same as that between the principal ray 6A" and the adjacent parallax images 5A and 7A on the two-dimensional display device as previously described. Accordingly, the arrangement of the adjacent parallax images entering the pupil 4 are opposite to that of the adjacent parallax images for the actual three-dimensional image. As a result, if a sphere such as the one shown in FIG. 7B is displayed; its contour appears to be notched as shown in FIG. 7C.

Figure 9:
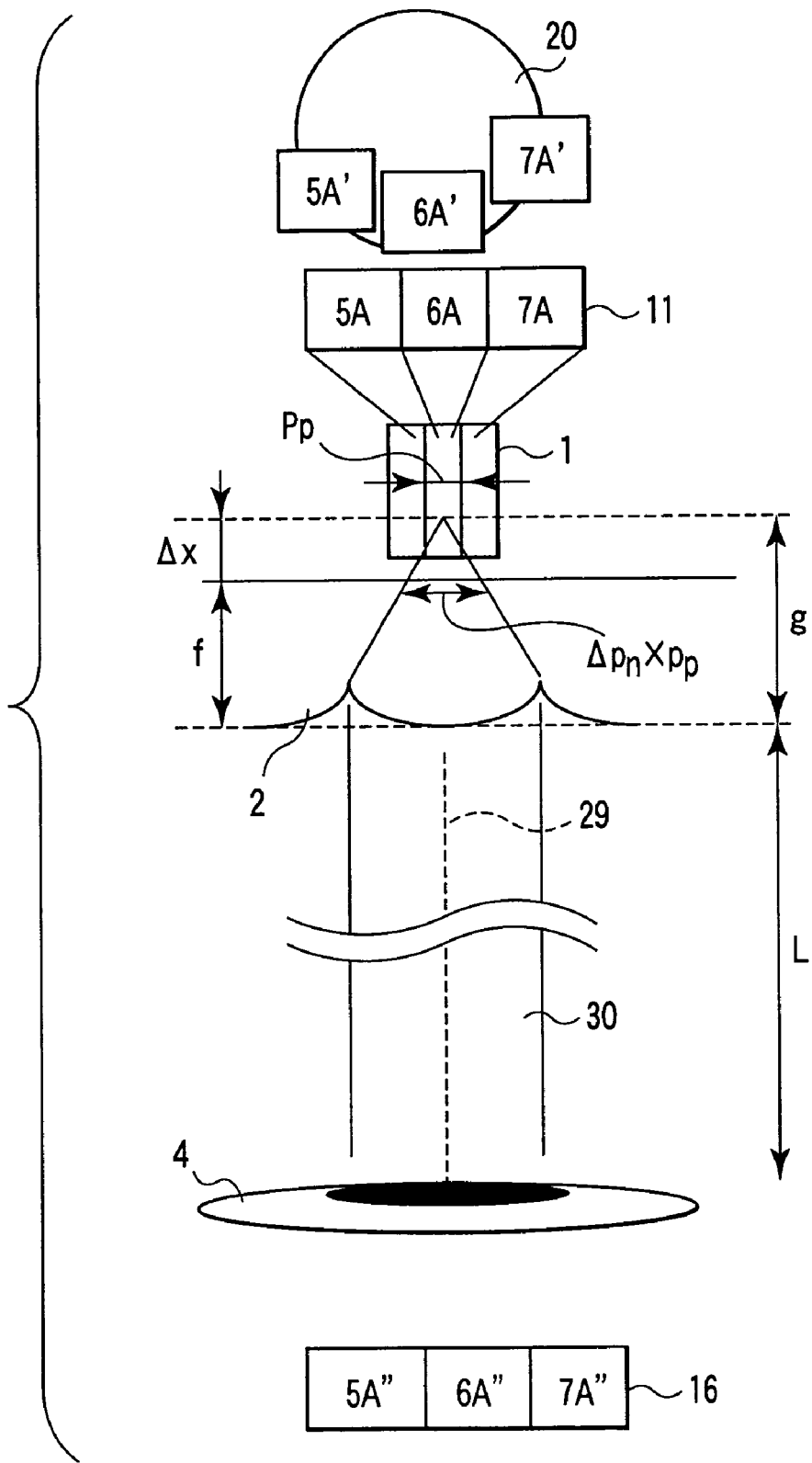
FIG. 9 is a schematic diagram of a horizontal plane schematically showing the arrangement relation-ship between a three-dimensional image and its parallax images in the three-dimensional display apparatus shown in FIG. 5, the relationship being observed when the three-dimensional object is displayed in the far-side region.

Now, description will be given of the case in which the gap g is shorter than the focal distance f of the lens 2 as shown in FIG. 9. Upon entering the lens, parallel rays traveling from the pupil 4 to the lens are condensed at the focal distance f. However, the light rays are not condensed on the two-dimensional display device owing to the short gap between the lens 2 and the two-dimensional display device. Since the light rays propagate rectilinearly, they enter the pupil 4 while maintaining the lateral arrangement of the adjacent parallax images on the two-dimensional display device. Thus, as is apparent from the description given with reference to FIG. 7A, during image formation, the parallax images on the two-dimensional images in the far-side region has the same lateral order as that of the parallax images contributing to the three-dimensional object in the far-side region. Accordingly, the arrangement of the adjacent parallax images entering the pupil 4 is the same as that of the adjacent parallax images for the three-dimensional image in the far-side region. Therefore, even though the principal rays corresponding to crosstalk are visible, they are smoothly joined to the principal rays from the adjacent lenses. However, as is apparent from the description given with reference to FIG. 8A, during image formation, the lateral order of the parallax images on the two-dimensional images is opposite to that of the parallax images contributing to the three-dimensional object 20 in the near-side region. Accordingly, in FIG. 8A, the arrangement of the adjacent parallax images entering the pupil 4 is laterally opposite to that of the adjacent parallax images for the three-dimensional image in the near-side region. As a result, possible crosstalk makes the contour of the image notched.

Description has been given above of how the three-dimensional object is viewed in the three-dimensional display apparatus in connection with the relationship between the focal distance g of the lens and the gap g between the lens 2 and the two-dimensional display device. If the gap g is longer than the focal distance f, the arrangement of the adjacent parallax images contributing to the three-dimensional object in the near-side region is correct even though crosstalk is visible. If the gap g is shorter than the focal distance f, the arrangement of the adjacent parallax images contributing to the three-dimensional object in the far-side region is correct even though crosstalk is visible.

Now, description will be given of conditions for arranging parallax images not only in the correct order but also at almost correct positions if crosstalk contributes to the formation of a three-dimensional image.

First, the amount of crosstalk occurring if the gap g is longer than the focal distance f, that is, the number $\Delta pn$ of parallax images entering the observer's pupil 4 is determined. Here, the number $\Delta pn$ is not limited to an integral value. Further, $\Delta pn \times p_p$ (pixel pitch) denotes the length of an area on the two-dimensional display device in which substantially parallel rays traveling from the pupil position to one of the lenses are condensed.

In FIG. 9, the focal distance and the lens pitch are defined as f and lp, respectively. The amount of increase in gap p is defined as $\Delta x$. The number of pixels defocused in a two-dimensional pattern display area is defined as $\Delta p_n$. The viewing area angle and the pixel pitch of the two-dimensional display module 1 are defined as $2\theta$ and $p_p$, respectively. The lenses 2A, 2B, and 2C of the lenticular lens are assumed to spherical.

Figure 10:
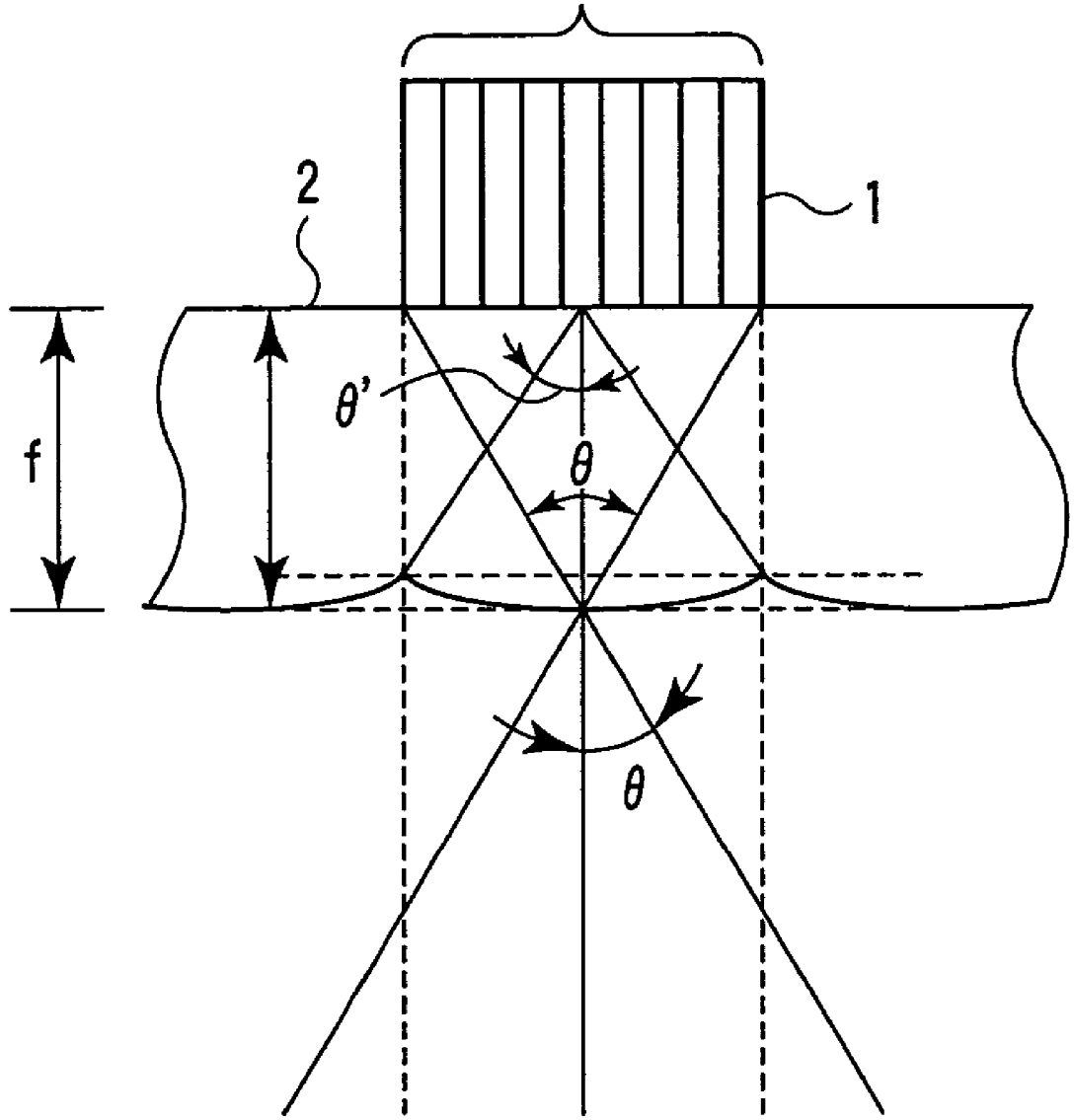
FIG. 10 is a schematic diagram of a horizontal plane schematically showing the loci of principal rays viewed by an observer in the three-dimensional display apparatus shown in FIG. 5, the loci being observed when a gap is set equal to a focal distance.

The viewing area angle $2\theta$ will be described below with reference to FIG. 10. Here, $\theta$ denotes, in an area containing all the parallax images (the total number of parallax images: NPmax) projected by one lens on the two-dimensional display device on a viewing area surface, the angle between light rays passing though a parallax image at an end of the area and the center of the lens 2 and light rays passing through a central parallax image and the center of the lens 2. Since $2\theta$ is the maximum angle through which a series of parallax images are visible through one lens 2, it is defined as a viewing area angle. On the other hand, $\theta'$ denotes the angle between light rays (the optical axis of the lens) joining together the central parallax image on the two-dimensional image device and the center of the lens and light rays passing though an end of the lens 2 if the gap between the two-dimensional display device and the lens surface is equal to the focal distance f of the lens. There actually is a difference in the height of concaves and convexes among the lenses 2. However, the difference is small, so that in FIG. 10, the angle $\theta'$ is substantially equal to the angle $\theta$.

If the angle $\theta'$ is equal to the angle $\theta$ and the angle $\theta$ ($=\theta'$), shown in FIG. 5, is small enough to be considered in connection with a paraxial area of the lens, the following expressions are given on the basis of the similarity between triangle.

$$g = f + \Delta x$$

$$f \cos \theta : lp = \Delta x : \Delta p_n \times p_p$$

Accordingly, the following expression is established.

$$\Delta p_n = lp \times \Delta x / (f \cos \theta \times p_p) \quad (7)$$

That is, the amount $\Delta p_n$ of increase in pixels is in proportion to the amount $\Delta x$ of increase in gap g.

It is possible to simply estimate a defocus area on the two-dimensional display module 1.

Now, with reference to FIG. 11, description will be given of the relationship between the amount znopt of near side of a three-dimensional image and the optimum gap g on the basis of the relationship between principal rays passing through adjacent parallax images on the surface of a three-dimensional object and light rays for the adjacent parallax images.

Figure 11:
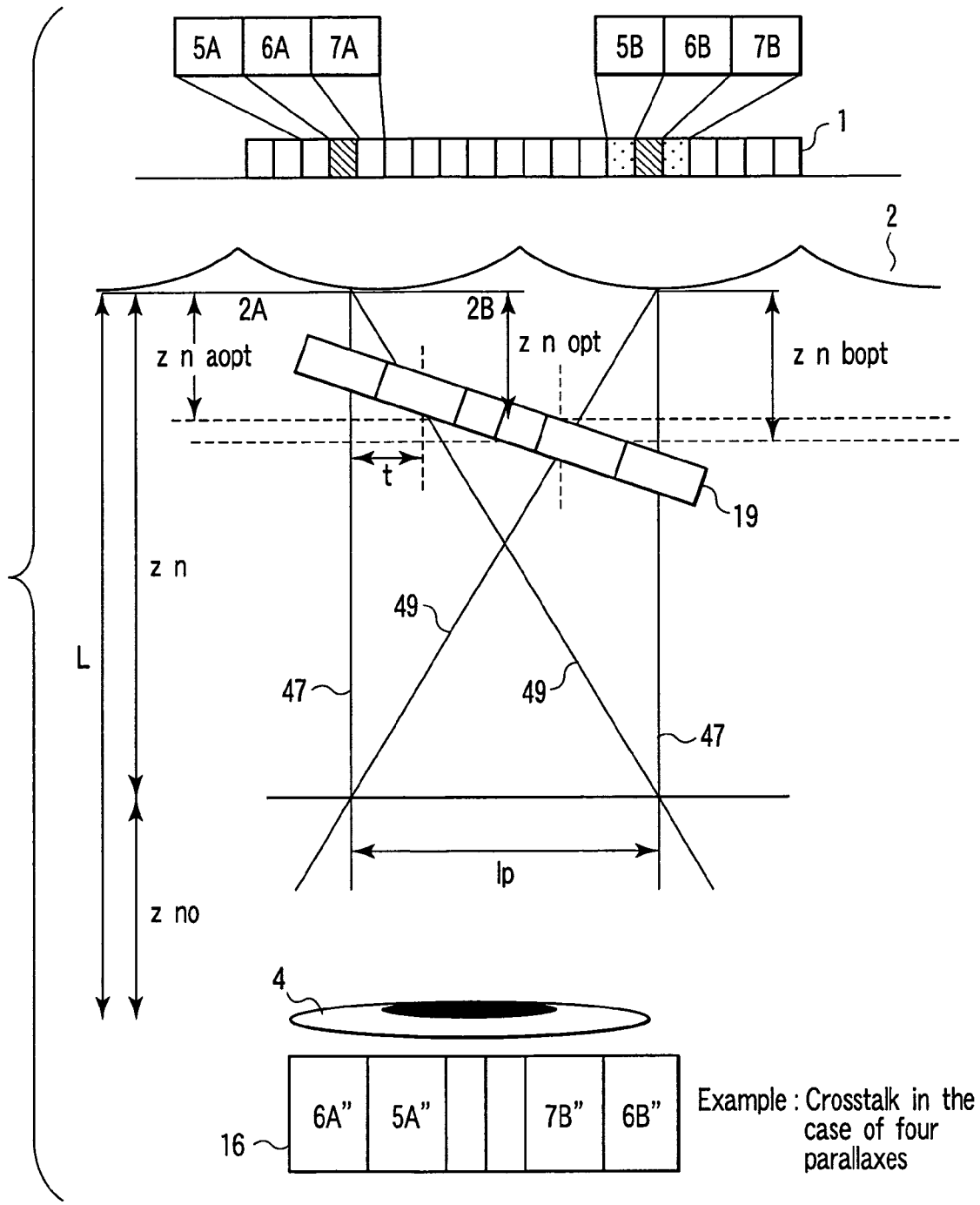
FIG. 11 is a schematic diagram of a horizontal plane schematically showing principal rays passing through adjacent parallax images on a three dimensional surface and light rays for adjacent parallax images, in the three-dimensional display apparatus shown in FIG. 5.

FIG. 11 shows the loci of principal rays and light rays for adjacent parallax images. In FIG. 11, reference numeral 47 denotes the loci of light rays from the central parallax images 6A and 6B for the lenses 2A and 2B, respectively. Reference numeral 49 denotes the locus of light rays for one adjacent parallax image 5A for the lens 2A and the locus of light rays for one adjacent parallax image 7B for the lens 2B. Further, zn denotes the distance from the ray control element at the position at which a principal ray from the lens A crosses an adjacent parallax ray from the lens B. Furthermore, t denotes the amount of horizontal offset between the principal ray 47 from the lens 2A and the central locus 49 of the adjacent parallax ray at a near-side position znaopt at the position of the three-dimensional object. The amount of near side of the three-dimensional image 19 at the midpoint between the adjacent lenses 2A and 2B is defined as znopt. Further, when the amount of near side of the adjacent parallax image at the lens 2A is defined as znaopt and the amount of near side of the adjacent parallax image at the lens 2B is defined as znbopt, these amounts are actually often different from each other. However, the following approximation is possible for a very small lens pitch and a continuous three-dimensional image.

$$znao \approx znopt \approx znbopt \quad (8)$$

When the principal ray emitted from the adjacent parallax and passing through the lens 2A or 2B is assumed to cross the principal ray from the adjacent lens 2A or 2B at a near-side position zn. The following expression is established on the basis of the similarity of triangles.

$$z_{naopt} : z_n = t : lp \quad (9)$$

The following expression is derived from Expression (8).

$$z_{nopt} : z_n = t : lp \quad (10)$$

Figure 12A:
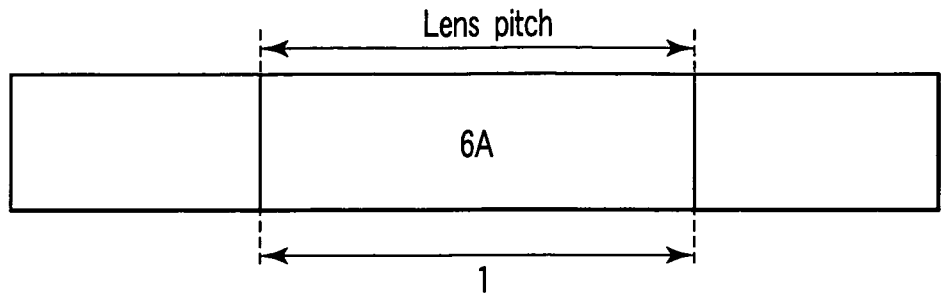
FIGS. 12A, 12B, and 12C are schematic diagrams schematically showing how parallax images are viewed per lens pitch if crosstalk occurs in the three-dimensional display apparatus shown in FIG. 5.
Figure 12B:
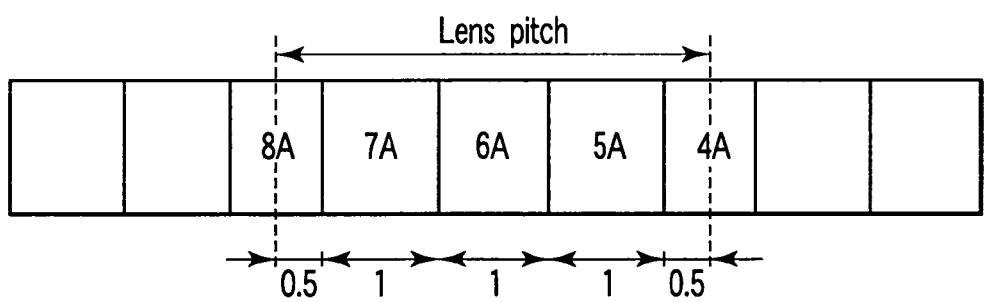
Figure 12C:
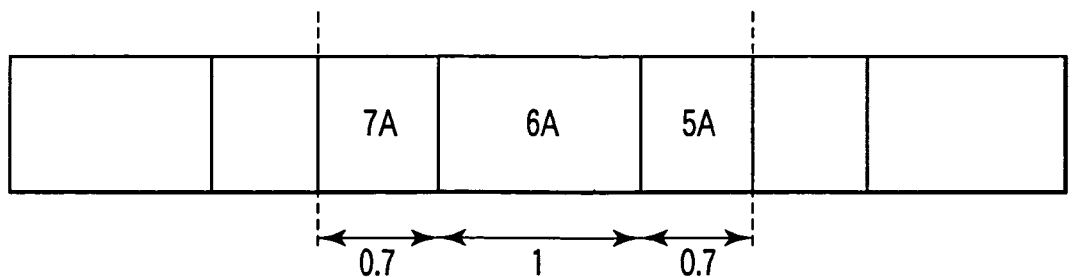

With reference to FIGS. 12A, 12B, and 12C, description will be given of how parallax images are viewed in the horizontal direction if crosstalk occurs. If the pupil 4 views the three-dimensional display apparatus, then without crosstalk, light rays from one lens 2A or 2B makes only one parallax image component visible as shown in FIG. 12A. However, if crosstalk results from the defocusing of the lens 2A or 2B as previously described, not only one parallax ray from one lens 2A or 2B but also adjacent parallax rays are visible. FIG. 12B shows the case in which the number $\Delta pn$ of parallax rays visible through one of the lenses 2A and 2B is 4. FIG. 12C shows the case in which the number $\Delta pn$ of parallax rays visible through one of the one lenses 2A and 2B is 2.4.

To allow adjacent parallel images appearing as crosstalk between adjacent principal rays to be viewed at the correct positions, it is advisable to arrange adjacent parallax images contributing to a three-dimensional object during image formation at the same positions as the adjacent parallax images appearing as crosstalk. Further, hardware determines the angle between a principal ray and the adjacent parallel image at a viewing distance. For example, when the number of parallaxes is defined as N and the viewing area angle is defined as $2\theta$, the above angle is $2\theta/(N-1)$ (degrees). Then, derivation of a relational expression for these terms enables the adjacent parallax images appearing as crosstalk to be viewed at the correct positions.

In connection with the amount of crosstalk, provided that the number of parallaxes visible through one lens is Δpn, the rate of visible adjacent parallax images per lens pitch is 1/lp. Further, provided that the distance between an adjacent parallax image and the corresponding principal ray at a position Znopt is t, the horizontal position of an adjacent parallax image constituting to a three-dimensional object per lens pitch is t/lp. If these are equal, that is, if the following expression is established, $$t:lp=1:\Delta pn \quad (11)$$

then the adjacent parallax image is shown so that the principal ray is interpolated so as to lie at the correct position. Then, Expressions (10) and (11) are combined together to derive:

$$z_{nopt} = t \times z_n / lp \quad (12)$$

$$= z_n / \Delta pn \quad (13)$$

Now, a method of determining $z_n$, shown in, Equation (13), will be described. $z_n$ is defined as a position where a resolution (Nyquist frequency) determined by the lens pitch is the same as a resolution determined by the density of light rays emitted by one lens if the three-dimensional apparatus is viewed at a viewing distance.

In the present embodiment, the parallax angle between the principal ray 47 and the light ray 49 for the adjacent parallax image is always the same. Accordingly, the same $z_n$ can be defined for any viewing angles including one in front of the apparatus.

According to H. Hoshino, F. Okano, H. Isono and I. Yuyama "Analysis of resolution limitation of integral photography" J. Opt. Soc. Am, A15 (1998) 2059-2065, a depth factor D is defined by:

$$D=\alpha_{imax}/\beta_{nyq} \quad (14)$$

On the basis of Expression (3), when $z_{no}$ denotes the distance from the position at the viewing distance to a three-dimensional object, the following expression is met in the case of the amount of near side.

$$\alpha_{imax} \times z_{no}/|L-z_{no}|=\beta_{nyq} \quad (15)$$

Here, the viewing distance L shown in FIG. 11 corresponds to the distance between the observer 4 and the lenticular lens 2, serving as a ray control element. Here, it should be noted that the viewing distance L corresponds to a reference distance used as a reference for calculation executed to create two-dimensional mapping data displayed on the two-dimensional display module in order to display a three-dimensional image. It should be further noted that the viewing distance L is a value inherent in image data and does not indicate the position of an arbitrary observer. The position $z_n$ in the near side area for which the following expression is established:

$$\beta_{nyq}=\beta_{imax}$$

can be expressed as follows. First, Expression (15) is modified in accordance with the condition $L-z_{no}>0$.

$$D \times z_{no}/(L-z_{no})=1$$

That is, the following expression is given.

$$D \times z_{no}=L-z_{no}$$

Therefore, the following expression is derived.

$$z_{no}=L/(1+D) \quad (16)$$

The reference is rewritten in terms of the amount $z_n$ of near side with respect to the ray control element 2 on or under the display surface instead of the position with respect to the observer 4. Then, the amount of near side meeting the following expression is almost equivalent to $z_n$, shown in FIG. 11.

$$z_n=L-z_{no}=L \times D/(1+D) \quad (17)$$

As disclosed in H. Hoshino, F. Okano, H. Isono and I. Yuyama "Analysis of resolution limitation of integral photography" J. Opt. Soc. Am, A15 (1998) 2059-2065, the following expression is established for the maximum pixel pitch.

$$D = \frac{(l_p)^2}{2\, Lp_p \tan(\theta)} \quad (18)$$

When the gap between the lens surface and the two-dimensional pattern display device is defined as gn, the following expression is given for the paraxial area in accordance with Expressions (7) and (13).

$$\Delta pn=z_n/z_{nopt}$$

$$\Delta pn=lp \times \Delta x/(f \cos\theta \times p_p)$$

$$\Delta x=(zn/z_{nopt}) \times f \cos\theta \times p_p/lp \quad (19)$$

Thus, if a three-dimensional display area is located at the position $z_{nopt}$, providing the gap with a value gn determined below enables a three-dimensional display with an increased resolution to be viewed because the adjacent parallax images compensate for the principal ray.

$$gn=f+\Delta x=f+(zn/z_{nopt}) \times f \cos\theta \times p_p/lp \quad (1)$$

For example, for a display at the near-side position shown in FIG. 11, if the amount Δpn of crosstalk, shown in FIG. 11, is equal to four parallaxes, the adjacent parallax images correctly interpolates the image from the adjacent lens in the corresponding direction. Thus, for a three-dimensional object near the display surface, the number of parallaxes visible through one lens is preferably increased, as in the case of Δpn=4 parallaxes, in order to allow the adjacent parallax images to be viewed at the correct positions.

FIG. 13 shows the case where the three-dimensional object is located away from the display surface. In this case, the adjacent parallax images are viewed at the optimum positions when the number Δpn of parallaxes, corresponding to the amount of crosstalk visible through one of the lenses 2A and 2B, is 2.4. The amount of crosstalk must be reduced below that in the example shown in FIG. 11. Accordingly, the adjacent parallax images are viewed at the correct positions when the length of the gap g between the two-dimensional display device and the lens surface is close to the focal distance f of the lens.

Now, with reference to FIG. 14, description will be given of an area with an increased resolution. When adjacent parallax images cross the corresponding adjacent principal rays at the position zn as shown in FIG. 14 and if the position zn is located in a near-side region with respect to zn/2, distantly adjacent parallax images for the principal rays pass through the three-dimensional image. As a result, a double image is viewed.

Thus, the following condition is required to allow the adjacent parallax images to correctly compensate for the principal rays.

$$0 < z_{nopt} < z_n/2 \quad (20)$$

Now, a method of measuring the amount of crosstalk will be described. For example, to measure the amount of crosstalk, R (red), G (green), and B (blue) sub-pixels are written to adjacent parallaxes so that the same color is used for the vertical direction of the lenticular lens 2, while different colors are used for the horizontal direction. Then, the colors are similarly written to the same parallax numbers of the adjacent lenticular lens 2. The amount of crosstalk can then be determined by moving a photodiode in the horizontal direction at the position of the observer and checking where the wavelength of each of R, G, and B is clearly observed. Alternatively, the amount of crosstalk can be roughly determined by the observer by subjectively evaluating the hues.

Description has been given of the method of improving the resolution of a three-dimensional object displayed in the near-side region. Then, description will be given of a method of improving the resolution of a three-dimensional object displayed in the far-side region.

In FIG. 9, the defocus area of the two-dimensional display module 1 is determined under geometrical conditions.

$$g = f - \Delta x$$

$$f \cos \theta : lp = \Delta x : \Delta p_n \times p_p$$

Accordingly, the following expression is given.

$$\Delta p_n = lp \times \Delta x / (f \cos \theta \times p_p) \quad (21)$$

Thus, conditions are determined under which an adjacent parallax image appearing as crosstalk even if it is displayed in the far-side region can be displayed at the correct position between principal rays of a three-dimensional image. When the position at which the adjacent parallax image crosses the adjacent principal ray is defined as zf, the following expressions are established.

$$\Delta x = (zf/z_{nopt}) \times f \cos \theta \times p_p/lp$$

$$f - \Delta x = f - (zf/z_{nopt}) \times f \cos \theta \times p_p/lp \quad (22)$$

Then, the position of zf is determined.

First, a position in the far-side region which meets the condition $\beta_{nyq} = \beta_{imax}$ is defined as zf. When the distance from the observer at the viewing distance L is defined as $z_{fo}$, the position $z_f$ in the far-side region which meets the condition $\beta_{nyq} = \beta_{imax}$ is determined as follows.

$$z_{fo} - L > 0$$

Expression (15) is modified to derive:

$$D \times z_{fo} = z_{fo} - L$$

That is, the following expression is given.

$$D \times z_{fo}/(z_{fo} - L) = 1$$

Therefore, the following expression is derived.

$$z_{fo} = L/(1-D)$$

The reference is rewritten in terms of the amount $z_f$ of near side with respect to the ray control element on or under the display surface instead of the position with respect to the observer. Then, the following expression is established.

$$z_f = z_{fo} - L = L \times D/(1-D)$$

Then, as in the case of the near-side region, in the far-side region, the adjacent parallax image is located at a horizontal position where it compensates for the corresponding principal ray when the following expression is met.

$$0 < Z < zf/2$$

$$0 < Z < L \times D/2(1-D) \quad (23)$$

Here, the depth factor D is determined as follows.

$$D = \frac{(l_p)^2}{2 L p_p \tan(\theta)}$$

Thus, in order to improve the resolution of the three-dimensional object displayed in the far-side region located at zfopt, the distance between the two-dimensional display device and the lens surface may be determined as follows in accordance with Expression (22).

$$gf = f - \Delta x = f - zf \times f \cos \theta \times p_p/lp/zfopt \quad (2)$$

Further, in order to prevent a double image caused by crosstalk, the range of far side of the three-dimensional object to which Expression (19) is applied may be determined as follows in accordance with Expression (20).

$$0 < Z < L \times D/(1-D)/2$$

$$D = \frac{(l_p)^2}{2 L p_p \tan(\theta)}$$

Now, problems with a change in gap will be discussed.

FIGS. 15A and 15B show a part of the three-dimensional display apparatus in connection with principal rays visible through the respective lenses 2 and parallax images 36 for the principal rays which enter the observer's eye if the gap g is equal to the focal distance f of the lens. The parallax images 36 provide parallax rays the number of which is only an integral multiple of the number N of the parallaxes. Accordingly, for example, when the parallax rays change from three to four parallaxes as shown in FIG. 15B, both parallax numbers of three and four parallaxes (number 3, numbers 3 and 4, number 4, numbers 4 and 5, and number 5) may be viewed. With such viewing, a visible image corresponds to the average of both parallax numbers.

FIGS. 16A and 16B show principal rays seen through the respective lenses 2 and parallax images for the principal rays which enter the observer's eye if the gap g is longer than the focal distance f of each lens. When the gap g is longer than the focal distance f, the eye views each parallel image 38 closer to an end of the whole lens than the corresponding parallax image 36 viewed when the gap g is as long as the focal distance f of the lens. Consequently, a three-dimensional image is viewed which is slightly reduced in the horizontal direction.

Further, FIGS. 17A and 17B show principal rays seen through the respective lenses 2 and parallax images for the principal rays which enter the observer's eye if the gap is shorter then the focal distance f of each lens. When the gap g is shorter than the focal distance f, the eye views each parallel image 37 closer to the center of the whole lens than the corresponding parallax images 36 viewed when the gap g is as long as the focal distance f of the lens. Consequently, a three-dimensional image is viewed which is slightly enlarged in the horizontal direction.

Description will be given of conditions under which parallax images slightly different from those which are intrinsically viewed are prevented from being seen as a result of a change in gap g. As is apparent from FIGS. 16A, 16B, 17A, and 17B, for the observer in front of the display apparatus, the parallax image is shifted most at the end of the screen. Thus, determination is made as to how the parallax image visible at the end of the screen is shifted when the gap g is changed. Strictly speaking, conditions for the case where the observer is located at the end of screen should be considered. However, since the observer often views the image in the center of the screen, this case will be particularly described.

FIG. 18 shows the relationship between the gap g and the viewing distance L and the viewing area angle 2θ. In FIG. 18, the viewing distance L is set during image formation, the lens pitch is defined as lp, and the angle of aperture θ is set half the viewing area angle 2θ. Further, pixel pitch, lens pitch, parallax number, and viewing area width are defined as $p_p$, g, N, and W, respectively. The distance from the pixel at the central position of the lens to the center of the pixel at the lens end is expressed by $(N-1) \times Pp/2$. Accordingly, the following expression is established on the basis of the similarity of triangles.

$$g:(N-1) \times Pp/2 = L:W/2$$

The gap g is obtained by:

$$g = L \times (N-1) \times Pp/2/W \times 2$$

In this case, since the viewing area angle is 2θ, the following expressions are given.

$$W = L \times \tan\theta \times 2$$

$$g = L \times (N-1) \times Pp/2/L/\tan\theta = (N-1) \times Pp/\tan\theta/2 \quad (24)$$

FIG. 19 shows how a parallax image projected on the two-dimensional pattern display device in connection with the corresponding adjacent principal ray deviates from the lens pitch if the lens pitch is the same as the parallax number x pixel pitch. In FIG. 19, Expression (25) is determined on the basis of the law of similarity for triangles.

$$L:L+g = lp:Y1$$

$$Y1 = (L+g) \times lp/L \quad (25)$$

With reference to FIG. 20, a deviation Ym (at g) for the M-lens from the center is calculated.

$$L:L+g = M \times lp:Ym$$

$$Ym(at\ g) = (L+g) \times M \times lp/L \quad (26)$$

According to Expression (26), the following relationship is established when the gap g has a length gn that is larger than the focal distance f.

$$Ym(at\ gn) = (L+gn) \times M \times lp/L$$

The following relationship is established when the gap g has a length gf that is smaller than the focal distance f.

$$Ym(at\ gf) = (L+gf) \times M \times lp/L$$

Thus, if the parallax image viewed at the end of the screen is set at most ±0.5 parallaxes away from the intrinsically viewed parallax image, specifically, ±0.7 parallaxes away from it taking into account areas in which black matrices are visible, the three-dimensional display is reduced or enlarged in the horizontal direction. Consequently, the three-dimensional display is not appropriately visible. Thus, in the case of the near-side region, the range within which the three-dimensional image is not deformed is determined by:

$$Ym(at\ g) - Ym(at\ gn) < 0.7 \times Pp \quad (27)$$

Expression (27) is then modified to derive:

$$(gn-g) \times M \times lp/L < 0.7 \times Pp$$

$$\Delta gn = gn - g < 0.7 \times Pp \times L/M/lp \quad (28)$$

Then, in the case of the far-side region, the range within which the three-dimensional image is not deformed is determined by:

$$Ym(at\ gf) - Ym(at\ g) < 0.7 \times Pp \quad (29)$$

Expression (29) is then modified to derive:

$$(g-gf) \times M \times lp/L < 0.7 \times Pp$$

$$\Delta gf = g - gf < 0.7 \times Pp \times L/M/lp \quad (30)$$

This indicates that Δgn is the same as Δgf.

When the M-th lens is located at the end of the screen and the width of the screen is defined as Wr, the inequality (31) is established.

$$M = Wr/2/lp$$

$$\Delta gn = \Delta gf < 0.7 \times Pp \times L/Wr \times 2 \times lp/lp$$

$$\Delta g < 0.7 \times Pp \times L/Wr \times 2 \quad (31)$$

By thus properly adjusting the gap, it is possible to allow not only light rays from the lens 2A but also light rays from the lenses 2B and 2C, which are adjacent to the lens 2A, to contribute to the display of a image part of a three-dimensional image to be displayed; the light ray from the lens 2A contributes to the display of the image part of the three-dimensional image to be displayed and the light rays from the lenses 2B and 2C otherwise cause crosstalk. In particular, when a three-dimensional view is to be displayed in the near-side region so as to be viewed by the observer, light rays from the adjacent lenses 2B and 2C can be utilized to appropriately display the three-dimensional image, by setting the distance from the end of the gap g to the parallel image on the display surface (corresponding to the distance between the surface of the lens 2A and the display surface) longer than the focal distance f of the lens 2A. In this case, the distance for the gap g must be set in accordance with a near-side distance Zn for the three-dimensional image to be displayed (a three-dimensional image displayed so as to protrude from the lens surface toward the observer). On the other hand, when a three-dimensional view is to be displayed in the far-side region (which lies opposite the observer with respect to the display surface) so as to be viewed by the observer, light rays from the adjacent lenses 2B and 2C can be utilized to appropriately display the three-dimensional image, by setting the distance from the end of the gap g to the parallel image on the display surface (corresponding to the distance between the surface of the lens 2A and the display surface) shorter than the focal distance f of the lens 2A. In this case, the distance for the gap g must be set in accordance with a far-side distance Zn for the three-dimensional image to be displayed (a three-dimensional image displayed so as to protrude from the lens surface toward the observer).

Description will be given below of a specific embodiment of the gap varying section 4, shown in FIG. 6.

Figure 21A:
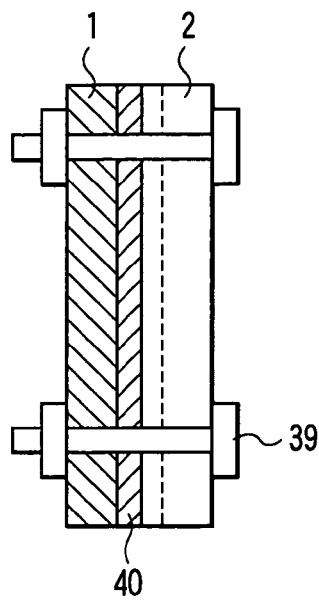
FIGS. 21A and 21B are a side and front views schematically showing a specific embodiment of the three-dimensional display apparatus shown in FIG. 5A.
Figure 21B:
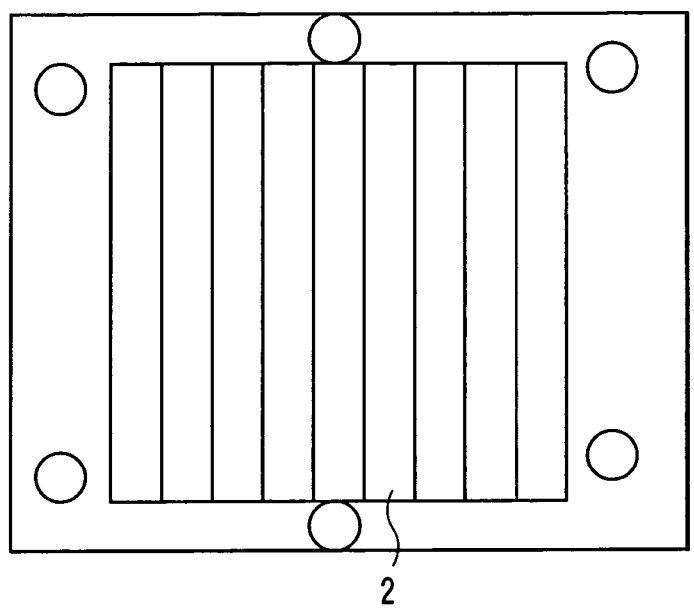

FIGS. 21A and 21B show a schematic side and front views, respectively, of a mechanism that mechanically varies the gap g substantially uniformly all over the screen. The mechanism shown in FIGS. 21A and 21B is provided with a thickness adjusting section 40 between the display module 1 and the lenticular lens 2. The thickness adjusting section 40 is a closing membrane section or pneumatic adjusting mechanism made of rubber and which expands or contracts depending on air pressure, or a stepping motor or actuator member which can adjust the gap length by causing deformation in response to an external signal.

Further, as already described with reference to FIG. 6, in order to control the gap length in accordance with the image, it is possible to set an ideal gap by attach a metafile to image data which file describes a typical near-side distance z for each image to be displayed.

The gap varying mechanism shown in FIGS. 21A and 21B must select whether to attach greater importance to the front- or far-side region in order to vary the position of the entire screen. That is, the metafile may specify an area (front- or far-side region) that is principally to be viewed by the observer.

Figure 22:
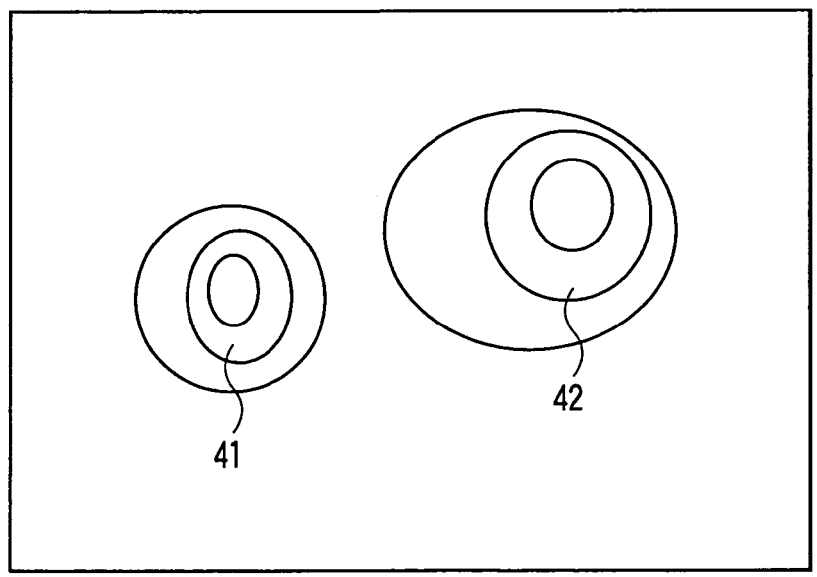
FIG. 22 is a plan view schematically showing an example of contours, in a z direction, of a three-dimensional object to be expressed in the three-dimensional display apparatus shown in FIG. 5A.

FIG. 22 shows an example of such a three-dimensional image as has a mixture of front- and far-side regions which are shown using contours. In FIG. 22, reference numeral 41 denotes contours of a three-dimensional image displayed in the near-side region. Reference numeral 42 denotes contours of a three-dimensional image displayed in the far-side region. For such a three-dimensional image as shown in FIG. 22, the gap g must be widened to increase the resolution of the three-dimensional image displayed in the near-side region. In contrast, the gap g must be narrowed to increase the resolution of the three-dimensional image displayed in the far-side region. If both front- and far-side regions of such an image need be simultaneously viewed with a high definition, it is preferable to employ an adjusting mechanism that can vary the distribution of the gap all over the screen, instead of the mechanism shown in FIG. 22. That is, the spacing between the display surface 1 and the surface of the lenticular lens 2 is adjusted so that the gap g is widened for the three-dimensional image shown with the contours 41 in FIG. 22 and that the gap g is narrowed for the three-dimensional image shown with the contours 42.

Figure 23:
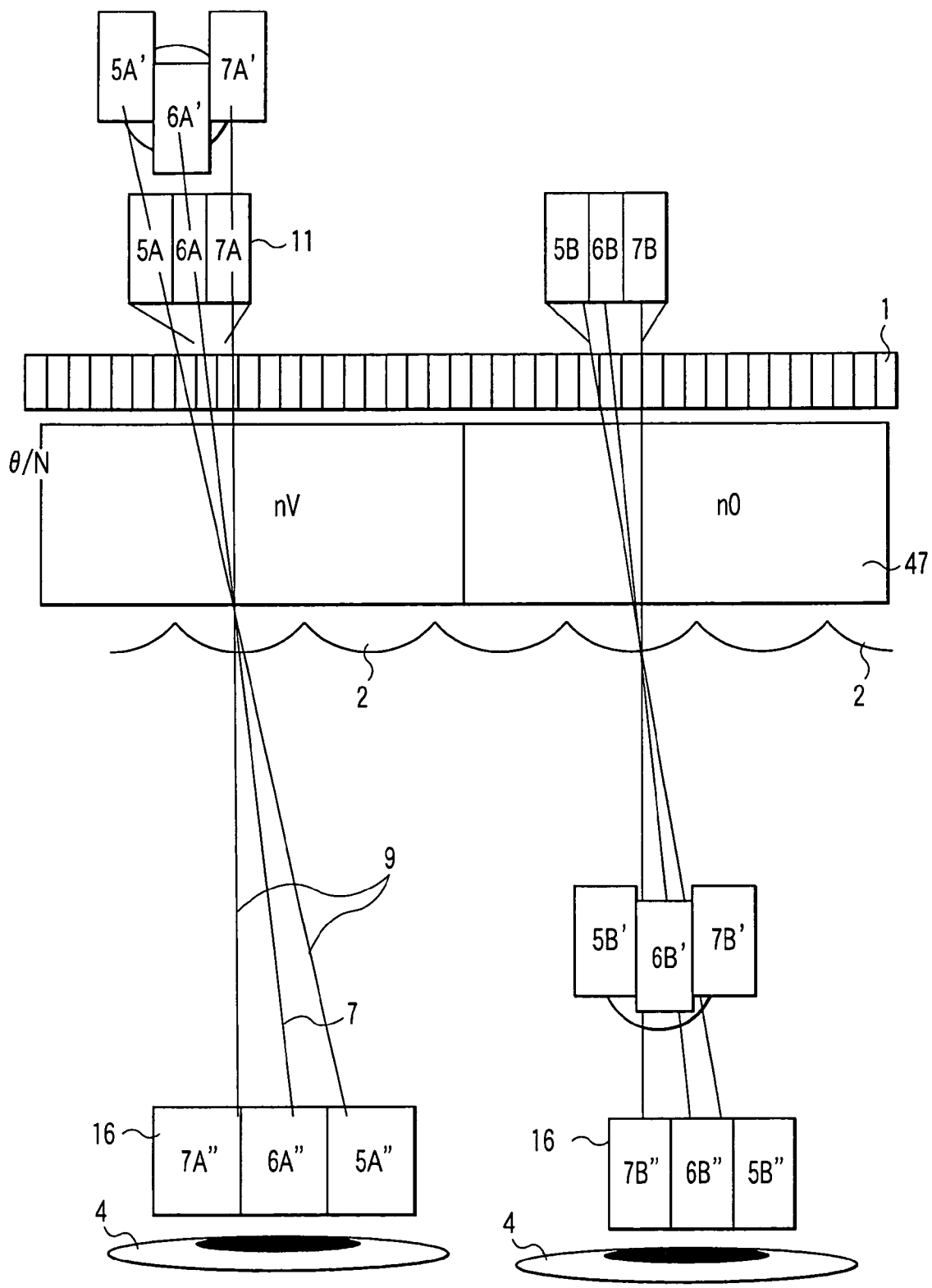
FIG. 23 is a schematic diagram of a horizontal plane schematically showing a three-dimensional display apparatus according to another embodiment of the present invention.
Figure 26:
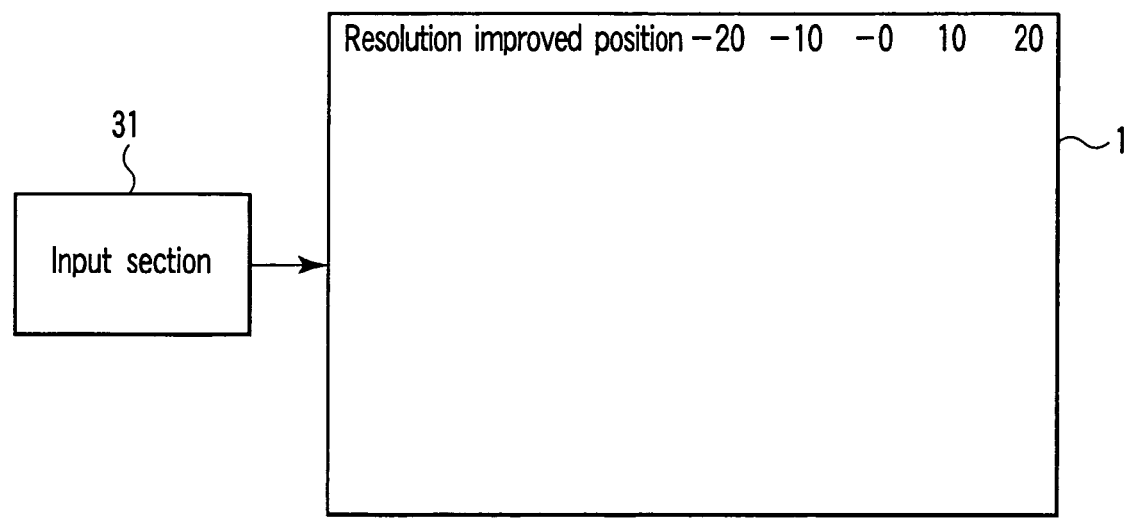
FIG. 26 is a waveform diagram of an embodiment showing a method of driving the three-dimensional display apparatus shown in FIG. 5.

FIG. 23 shows a display apparatus that partially adjusts the gap length in the screen of the display module 1. In this display apparatus, the gap length is not uniform all over the screen but has a certain gap distribution.

In the apparatus shown in FIG. 23, a transparent layer 47, for example, a layer of a transparent liquid crystal, is interposed between the lens 2 and the display module 1; the transparent layer 47 has a refractive that can be varied by an applied voltage. Specifically, the transparent layer 47 is composed of a liquid crystal for an active matrix system. The refractive index of the transparent layer 47 is varied depending on a place of the layer by controlling the applied voltage. In this case, a liquid crystal in a normal TN mode has its torsion amount varied by electric fields and thus has its refractive index varied between a vertical mode and a horizontal mode in connection with a glass substrate. This results in a variation in gap in terms of air. For the gap length, a larger electric field must be applied to a thicker layer in order to vary its refractive index. Thus, with a thick liquid crystal layer, electrodes are preferably provided in the liquid crystal layer so that the voltage is controlled in a plurality of layers. In the illustrated example, the refractive index is kept at nV in an area 47-1 and at n0 in an area 47-02. When the transparent layer 47 has an actual thickness t0, the gap length in terms of air in the area 47-1 is t0/nV. Further, the gap length in terms of air in the area 47-2 is t0/n0. Thus, a display apparatus such as the one shown in FIG. 23 can display at least two images in a front- and far-side regions within one screen, simultaneously, smoothly, and clearly with a high definition.

If the three-dimensional image to be displayed is a still one, for example, a photographic one, it is possible to provide a predetermined distribution in which fixed gap lengths are determined for the respective areas of the still image and are set all over the screen. FIG. 24 shows a display apparatus with a predetermined distribution in which fixed gaps are provided all over the screen. In the display apparatus shown in FIG. 24, a film-like transparent member 45 with a predetermined thickness distribution is provided on the display module 1. Lenticular lenses 44 are provided on the transparent member 45. The film-like transparent member 45 is provided with gaps g for the respective areas in accordance with the position z in the front- or far-side region of a still image such as a photograph which does not change. The lenticular lenses 44 are preferably made of a material that can be provided with a sufficient flexibility to allow the lenses to be bent to some degree. In the display apparatus shown in FIG. 24, the optimum gap is provided in accordance with the near-side amount of a three-dimensional image to be displayed. This makes it possible to display smooth three-dimensional images with a high resolution to be displayed in the front- and far-side regions.

The display apparatus comprising the gap adjusting mechanism may be subjected to display driving such that the gap can be varied at a certain period as shown in FIG. 25. If the gap can be varied at a short period over time as shown in FIG. 25, the resolution can be increased in both rear- and near-side regions of the same display content. That is, the gap g can be temporally varied so as to provide the optimum gap length for each part of the screen in either the front- or far-side region over time. As a result, three-dimensional images can be displayed with a high resolution utilizing the afterimage of the eye.

It is also possible to prepare specified items relating to resolution improved positions for the optimum gap length so that the observer can specify any of the positions. That is, the display module 1 may display items relating to the resolution improved positions so that the observer can choose any of the items before causing the display module 1 to display a three-dimensional image. In other words, the observer can cause the three-dimensional display apparatus to display a three-dimensional image in the front- or far-side region and then view the actually displayed three-dimensional image to determine whether or not to improve its resolution. If the observer desires to adjust the resolution, he or she can provide the display apparatus with the optimum gap g by sequentially choosing from the items relating to the resolution improved positions. In this case, a character or a three-dimensional object with an oblique contour, desirably a spherical object, may be placed at a typical far-side position as a sample so that while viewing the image, the observer can specify any of the resolution improved positions to set the gap length. When the input section 31 is used to specify the resolution improved position, the gap between the two-dimensional display module and each lens is adjusted. Consequently, the observer can confirm that the principal rays for the character or three-dimensional object have been compensated for by appropriate adjacent parallax images. This method makes it possible to express a three-dimensional object to the observer's liking.

Two-dimensional display modules to which the present invention is applicable include planar display modules such as a liquid crystal display module, an organic EL display module, and an FED (Field Emission Display). However, the present invention is not limited to these display modules as is apparent from the spirit of the present invention.

In the description of the present invention, the lenticular lens is used as an optical element having optical apertures. However, the present invention is applicable to a lens array having lenses arranged in both vertical and horizontal directions in an array. In addition, the lenticular lens has no light blocking section regardless of a viewing position and thus provides a continuous image. Accordingly, the lenticular lens is suitably incorporated in a three-dimensional display apparatus as an optical element.

Now, the present invention will be described in conjunction with a method applied to the case where slits are used as ray control elements. For example, if the width of the aperture section is set larger than the pixel width in order to reduce moiré or to improve luminance, adjacent parallax images are viewed in a fixed manner regardless of the size of the gap. The eye sees the arrangement of the adjacent parallax images on the two-dimensional display as it is as shown in FIG. 9. Consequently, only for a three-dimensional object in the far-side region, the adjacent parallax images serve to correctly express the corresponding principal light rays. Further, in some structures, the width of the aperture section is smaller than the pixel width, so that the adjacent parallax images are difficult to see. Even in this case, if the three-dimensional display apparatus has such a high ray density that the adjacent parallax image can be easily seen through one aperture section, the arrangement of the adjacent parallax images entering the eye is opposite to that on the two-dimensional display device as shown in FIG. 5, so that the gap adjustment according to the present invention is effective only on a three-dimensional object in a near-side direction.

The present invention is applicable even if the lenticular lenses or slits serving as ray control elements are arranged obliquely to the two-dimensional display module in order to prevent moiré.

According to the present invention, the adjacent parallax images entering the single eye compensate for the corresponding principal rays. Another method uses both eyes to compensate for insufficient light rays. However, compared to the method using the single eye, this method may fatigue the eyes as a result of the unbalance between a right and left images. Accordingly, the single eye is desirably used to improve the resolution.

The present invention can provides an apparatus and method of three-dimensional display which utilizes crosstalk to improve the resolution of an image in accordance with the desided amount of near or far side.

In the three-dimensional display apparatus, the resolution near the display surface is determined by the lens pitch. However, the resolution can be improved utilizing adjacent parallax images, by varying the gap between the lens surface and the two-dimensional display module depending on the display position in the rear- or near-side region.

As described above, the present invention can increase the resolution of a three-dimensional display apparatus using a ray control element and a two-dimensional pattern display module.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display apparatus for displaying a three-dimensional image, comprising:
    a display module having a display surface on which pixels are arranged in matrix, parallax images being allotted to the pixels;
    an optical element facing the display module, having optical apertures arranged in association with the parallax images, and configured to project the parallax images to a near-side region and display one of first three-dimensional image in the near-side region and a second three-dimensional image in a far-side region located opposite the near-side region with respect to the display module; and
    a gap setting section configured to set a first optical gap between the optical element and the display surface to display the first three-dimensional image in the near-side region, the first optical gap having a first gap length longer than a reference distance which is determined depending on a position of the three-dimensional image, and a second optical gap between the optical element and the display surface to display the second three-dimensional image in the far-side region, the second optical gap having a second gap length being shorter than the reference distance.

2. The display apparatus according to claim 1, wherein the optical element includes a lenticular lens, the optical apertures corresponds to the respective lenses of the lenticular lens, and the reference distance corresponds to a focal distance of each lenticular lens.

3. The display apparatus according to claim 2, wherein the first three-dimensional image is displayed in the near-side region on a first coordinate (znopt), if the first optical gap is set to be a gap length gn, the second three-dimensional image is displayed in the far-side region on a second coordinate (zfopt), if the second gap is set to be a gap length gf, and the gap lengths gn and gf are substantially set as shown in:

$$gn = f + zn \times (f \times \cos\theta \times p_p)/znopt/lp \quad (1)$$

$$gf = f - zf \times (f \times \cos\theta \times p_p)/zfopt/lp \quad (2)$$

where f denotes the focal distance of each lens, L denotes a viewing distance corresponding to the reference distance estimated from the first and second three-dimensional images, lp denotes a pitch of the lenses, 2θ denotes a viewing area angle which defines a range in which the correct first and second three-dimensional images are observable, the viewing area angle being defined in a plane containing an optical axis of the lens, and $p_p$ denotes a pitch of the pixels, wherein zn and zf are defined by:

$$zn = L \times D/(1+D) \quad (3)$$

$$zf = L \times D/(1-D) \quad (4)$$

where D is defined by:

$$D = \frac{(l_p)^2}{2 L p_p \tan(\theta)}$$

, and
    wherein the first and second coordinates znopt and zfopt have ranges defined by:

$$0 < Znopt < L \times D/(1+D)/2 \quad (5)$$

$$0 < Zfopt < L \times D/(1-D)/2 \quad (6).$$

4. The display apparatus according to claim 2, wherein if the gap length is defined by g and the amount of variation in gap is defined as $\Delta g$, the gap length and the amount of variation in gap are selected within a range shown by:

$$g-\Delta g < g < g+\Delta g$$

$$\Delta g < 0.7 \times Pp \times L/Wr/2$$

(where Pp denotes a pixel pitch and Wr denotes the width of the display surface of the module).

5. The display apparatus according to claim 1, wherein the gap setting section includes a mechanism which can vary the gap.

6. The display apparatus according to claim 1, wherein the gap setting section includes a refractive index varying mechanism which adjust the gap length converted substantially in terms of air by varying the refractive index of the gap.

7. The display apparatus according to claim 6, wherein the refractive index varying mechanism includes a liquid crystal and an electrode which applies a voltage to the liquid crystal, to partly vary the refractive index depending on an area on the display surface.

8. The display apparatus according to claim 7, wherein the refractive index varying mechanism is based on an active matrix system and includes a TFT structure.

9. The display apparatus according to claim 1, wherein the gap setting section includes a film-like membrane provided with a distribution of thickness so as to provide a gap length varying with respect to the display surface in order to display a still three-dimensional image.

* * * * *